United States Patent
Andreola et al.

(10) Patent No.: US 12,063,934 B2
(45) Date of Patent: Aug. 20, 2024

(54) **BLACK SOLDIER FLY (*HERMETIA ILLUCENS*) LARVAE FRASS FORMULATIONS, COMBINATIONS AND USES**

(71) Applicant: Chonex, Inc., Birmingham, AL (US)

(72) Inventors: Sofia Andreola, Birmingham, AL (US); Michael Lynch, Birmingham, AL (US); William Marion, Birmingham, AL (US); Lori Moshman, Birmingham, AL (US)

(73) Assignee: Chonex, Inc., Birmingham, AL (US)

( * ) Notice: Subject to any disclaimer, the term of this patent is extended or adjusted under 35 U.S.C. 154(b) by 0 days.

(21) Appl. No.: 18/144,247

(22) Filed: May 8, 2023

(65) Prior Publication Data
US 2023/0363395 A1   Nov. 16, 2023

Related U.S. Application Data

(60) Provisional application No. 63/364,493, filed on May 10, 2022, provisional application No. 63/386,843, filed on Dec. 9, 2022, provisional application No. 63/442,533, filed on Feb. 1, 2023.

(51) Int. Cl.
| | |
|---|---|
| *A01N 63/14* | (2020.01) |
| *A01N 43/54* | (2006.01) |
| *A01N 43/70* | (2006.01) |
| *A01N 57/20* | (2006.01) |
| *A01N 63/22* | (2020.01) |
| *A01P 3/00* | (2006.01) |
| *A01P 21/00* | (2006.01) |
| *C05F 3/00* | (2006.01) |
| *C05F 17/05* | (2020.01) |

(52) U.S. Cl.
CPC .............. *A01N 63/14* (2020.01); *A01P 3/00* (2021.08); *A01P 21/00* (2021.08); *C05F 3/00* (2013.01); *C05F 17/05* (2020.01)

(58) Field of Classification Search
None
See application file for complete search history.

(56) References Cited

U.S. PATENT DOCUMENTS

| | | |
|---|---|---|
| 9,844,223 B2 | 12/2017 | Vickerson |
| 10,159,229 B2 | 12/2018 | Marchant |
| 10,842,138 B1 | 11/2020 | Lolley |
| 2019/0021340 A1 | 1/2019 | Hu |
| 2021/0137137 A1 | 5/2021 | Leo |

FOREIGN PATENT DOCUMENTS

| | | |
|---|---|---|
| CN | 108835456 A | 11/2018 |
| EP | 3978004 A1 | 4/2022 |
| KR | 101465096 B1 | 11/2014 |
| KR | 10-2022-0007187 | 1/2022 |
| WO | 2020234884 A1 | 11/2020 |
| WO | 2020246877 A1 | 12/2020 |
| WO | 2021054823 A1 | 3/2021 |

OTHER PUBLICATIONS

Garttling, D. et al., "Compilation of black soldier fly frass analyses," Journal of Soil Science and Plant Nutrition, vol. 22, pp. 937-943 (2022).*
Fischer, H. et al., "Fruit, vegetable, and starch mixtures on the nutritional quality of black soldier fly (*Hermetia illucens*) larvae and resulting frass," Journal of Insects as Food and Feed, vol. 7(3), pp. 319-327 (2021).*
Boaru et al. (2018) Studies regarding the fertilizing capacity of poultry manure biocomposted by fly larvae (Diptera: Stratiomyidae). AAB Bioflux. 10(3): 114-121.
Boraste et al. (2009) Biofertilizers: a novel tool for agriculture. International Journal of Microbiology Research 1(2): 23-31.
Chavez and Uchanski (2021) Insect left-over substrate as plant fertiliser. Journal of Insects as Food and Feed 7(5): 683-694.
Choi and Hassanzadeh (2019) BSFL Frass: a novel biofertilizer for improving plant health while minimizing environmental impact. The Canadian Science Fair Journal 2: 41-46.
Choi et al. (2009) Potential Usage of Food Waste as a Natural Fertilizer after Digestion by Hermetia illucens (Diptera: Stratiomyidae). Int. J. Indust. Entomol. 19(1): 171-174.
Cickova et al. (2015) The use of fly larvae for organic waste treatment. Waste Management 35: 68-80.
De Smet et al. (2018) Microbial Community Dynamics during Rearing of Black Soldier Fly Larvae (*Hermetia illucens*) and Impact on Exploitation Potential. Applied and Environmental Microbiology 84(9): 1-17.
Einpresswire.com/article/567891963/alabama-agtech-innovator-nex-strongsoil-offers-sustainable-affordable-solution-to-skyrocketing-fertilizer-prices.
Future Farmer Magazine, Feb. 2022, URL:https://issuu.com/fmspotlight/docs/ff_janfeb22_1/64.
Gharib et al. (2008) Effect of compost and bio-fertilizers on growth, yield, and essential oil of sweet Marjoram (*Majorana hortensis*) plant. Int. J. Agric. Biol. 10: 381-387.
Gold et al. (2018) Decomposition of biowaste macronutrients, microbes, and chemicals in black soldier fly larval treatment: A review. Waste Management 82: 302-318.
Houben et al. (2020) Potential use of mealworm frass as a fertilizer: Impact on crop growth and soil properties. Scientific Reports 10: 4659 https://doi.org/10.1038/s41598-020-61765-x.
Ingham (2005). The Compost Tea Brewing Manual, 5th ed. 91 pp.

(Continued)

*Primary Examiner* — John Pak
(74) *Attorney, Agent, or Firm* — Cherryl H. Agris; Agris & von Natzmer, LLP

(57) ABSTRACT

Provided are one or more black soldier fly (*Hermetia illucens*) larvae frass formulations and combinations comprising said formulations and at least one other substance including but not limited to soil amendment, fertilizer, herbicide, pesticide, fungicide, nematicide or bactericide, uses for said formulations and combinations and methods of production of said formulations.

27 Claims, 7 Drawing Sheets

(56) References Cited

OTHER PUBLICATIONS

Jayanegara et al. (2020) Derivatization of Chitin and Chitosan from Black Soldier Fly (*Hermetia illucens*) and Their Use as Feed Additives: An In vitro Study. Advances in Animal and Veterinary Sciences 8(5): 472-477.

Jucker et al. (2020) Nutrient Recapture from Insect Farm Waste: Bioconversion with *Hermetia illucens* (L.) (Diptera: Stratiomyidae). Sustainability 12:362: https://doi.org/10.3390/su12010362.

Jucker et al. (2017) Assessment of Vegetable and Fruit Substrates as Potential Rearing Media for Hermetia illucens (Diptera: Stratiomyidae) Larvae. Environmental Entomology 46(6): 1415-1423.

Klammsteiner et al. (2020) Suitability of Black Soldier Fly Frass as Soil Amendment and Implication for Organic Waste Hygienization. Agronomy 10: 1-18.

Koutsos et al. (2019) Insect Composition and Uses in Animal Feeding Applications: A Brief Review. Ann. Ent. Soc. Am. 20(10).

Lalander et al. (2020) Effects of feedstock on larval development and process efficiency in waste treatment with black soldier fly (*Hermetia illucens*). Journal of Cleaner Production 208: 211-219.

Lopes et al., (2022) Frass derived from black soldier fly larvae treatment of biodegradable wastes. A critical review and future perspectives. Waste Management 142:65-76.

Makkar et al. (2014) State-of-the-art on use of insects as animal feed. Animal Feed Science and Technology 197: 1-33.

Naidu et al. (2010) Microbial starter for the enhancement of biological activity of compost tea. Int. J. Agric. Biol. 12: 51-56.

Niyonsaba et al. (2021) Profitability of insect farms. Journal of Insects as Food and Feed 7(5): 923-93.

Oliver et al. (2006) On-farm management practices to minimize off-site movement of pesticides from furrow irrigation. Pest Management Sci. 62: 899-911.

Scheuerell and Mahaffee (2002) Compost tea: Principles and prospects for plant disease control. Compost Science & Utilization 10(4):313-338.

Schmitt and de Vries (2020) Potential benefits of using Hermetia illucens larvae frass as a soil amendment on food production and for environmental impact reduction. Current Opinion in Green and Sustainable Chemistry, https://doi.org/10.1016/j.cogsc.2020.03.005.

Shahrajabian et al. (2021) Sustainable agriculture systems in vegetable production using chitin and chitosan as plant biostimulants. Biomolecules 11: 819, https://doi.org/10.3390/biom11060819.

Suckling et al. (2020) The environmental impact of rearing crickets for live pet food in the UK, and implications of a transition to a hybrid business model combining production for live pet food with production for human consumption. International Journal of Life Cycle Assessment 25: 1693-1709.

Tan et al. (2021) Applications of food waste-derived black soldier fly larval frass as incorporated compost, side-dress fertilizer and frass-tea drench for soilless cultivation of leafy vegetables in biochar-based growing media. Waste Management 130:155-166.

Wang et al. (2020) Physicochemical structure of chitin in the developing stages of black soldier fly. International Journal of Biological Macromolecules 149: 901-907.

Wang and Shelomi (2017) Review of Black Soldier Fly (*Hermetia illucens*) as Animal Feed and Human Food. Foods 6:91: doi: 10.3390/foods6100091.

Wasko et al. (2016) The first report of the physicochemical structure of chitin isolated from Hermetia illucens. International Journal of Biological Macromolecules 92: 316-320.

Yildirim-Aksoy et al. (2020) Use of dietary frass from black soldier fly larvae, *Hermetia illucens*, in hybrid tilapia (Nile x Mozambique, Oreocromis niloticus x O. mozambique) diets improves growth and resistance to bacterial diseases. Aquaculture Reports 17: 100373 https://doi.org/10.1016/j.aqrep.2020.100373.

PCT appln. No. PCT/US2023/061712, International Search Report and Written Opinion dated May 26, 2023.

\* cited by examiner

Tomato standard irrigation

Tomato reduced irrigation

BLACK SOLDIER FLY (*HERMETIA ILLUCENS*) LARVAE FRASS FORMULATIONS, COMBINATIONS AND USES

TECHNICAL FIELD

Provided are black soldier fly (*Hermetia illucens*) larvae frass formulations, combinations, preparation methods and uses.

BACKGROUND ART

During past years, pesticides, herbicides and chemical fertilizers have become the foundation of highly productive forms of agriculture. However, accompanying their indiscriminate use, comes the risk of pollution, serious changes in ecological symmetry and poisoning (Danielle et al. (2006) On-farm management practices to minimize off-site movement of pesticides from furrow irrigation. *Pest Management Sci.* 62: 899-911). As a result, more sustainable alternatives are being sought to replace or compliment these strategies. In recent years, the use of microbial systems for nutrient mobilization, or as biofertilizers are getting popular and new systems are being introduced to cater to different cropping systems.

Composts or compost extracts used as an organic fertilizer have beneficial effects on plant growth and are considered to be a valuable soil amendment (Gharib et al. (2008) Effect of compost and bio-fertilizers on growth, yield, and essential oil of sweet Marjoram (*Majorana hortensis*) plant. *Int. J. Agric. Biol.* 10: 381-387). Compost tea, a water-based compost extract containing a high population of beneficial microbes, has attracted the attention of growers and researchers for its apparent disease-suppressive activity and improvement of soil fertility (Naidu et al. (2010) Microbial starter for the enhancement of biological activity of compost tea. *Int. J. Agric. Biol.* 12: 51-56).

Black soldier flies (*Hermetia illucens* Diptera: Stratiomyidae; BSF) are well known decomposers of organic materials (Gold et al. (2018) Decomposition of biowaste macronutrients, microbes, and chemicals in black soldier fly larval treatment: A review. *Waste Management* 82: 302-318; Jucker et al. (2017) Assessment of Vegetable and Fruit Substrates as Potential Rearing Media for *Hermetia illucens* (Diptera: Stratiomyidae) Larvae. Environmental Entomology 46(6): 1415-1423). These insects are convenient to rear in mass-production scenarios due to their tendency to aggregate 35 in dense colonies, tolerance of a wide range of environmental conditions and feedstocks, and low risk of becoming an environmental pest or disease vector (See, U.S. Pat. Nos. 10,842,138 and 10,159,229 for examples of systems devised for culturing BSF and Cickova et al. (2015) The use of fly larvae for organic waste treatment. *Waste Management* 35: 68-80 for a review of various systems).

BSF has attracted commercial interest for their ability to convert agricultural waste streams into products for human food and animal feed (Wang and Shelomi (2017) Review of Black Soldier Fly (*Hermetia illucens*) as Animal Feed and Human Food. *Foods* 6:91:doi:10.3390/foods6100091); Lalander et al. (2020) Effects of feedstock on larval development and process efficiency in waste treatment with black soldier fly (*Hermetia illucens*). *Journal of Cleaner Production* 208: 211-219; WO2021054823A1), and soil health (Boaru et al. (2018) Studies regarding the fertilizing capacity of poultry manure biocomposted by fly larvae (Diptera: Stratiomyidae). *AAB Bioflux.* 10(3): 114-121 and WO2020246877A1). In particular, BSF larvae have been found to possess beneficial qualities as a feed source for livestock including poultry, swine, and fish (Koutsos et al. (2019) Insect Composition and Uses in Animal Feeding Applications: A Brief Review. *Ann. Ent. Soc. Am.* 20(10): 1-8; Makkar et al. (2014) State-of-the-art on use of insects as animal feed. *Animal Feed Science and Technology* 197: 1-33). Products derived from BSF larvae (e.g., particles, extracts) have also been found to be useful as a housefly (US2019/0021340) and *thrips* (WO2021054823A1) repellant and active in culture against certain types of animal bacteria (see, for example, KR101465096B1, WO2020234884A1, CN108835456A). Therefore, mass reared BSF are frequently raised on controlled feedstocks in order to produce feed in the form of dried larvae or derivatives thereof (De Smet et al. (2018) Microbial Community Dynamics during Rearing of Black Soldier Fly Larvae (*Hermetia illucens*) and Impact on Exploitation Potential. *Applied and Environmental Microbiology* 84(9): 1-17).

A byproduct of BSF production is excrement (frass) produced by larvae during feeding. Frass production is not limited to BSF but is common to numerous other insect-rearing operations including cricket (Jucker et al. (2020) Nutrient Recapture from Insect Farm Waste: Bioconversion with *Hermetia illucens* (L.) (Diptera: Stratiomyidae). Sustainability 12:362: https://doi.org/10.3390/su12010362; Suckling et al. (2020) The environmental impact of rearing crickets for live pet food in the UK, and implications of a transition to a hybrid business model combining production for live pet food with production for human consumption. *International Journal of Life Cycle Assessment* 25: 1693-1709), mealworm (Houben et al. (2020) Potential use of mealworm frass as a fertilizer: Impact on crop growth and soil properties. *Scientific Reports* 10: 4659 https://doi.org/10.1038/s41598-020-61765-x), and housefly (Chavez and Uchanski (2021), Insect left-over substrate as plant fertiliser. *Journal of Insects as Food and Feed* 7(5): 683-694). However, frass composition and properties can vary widely depending on the source of feedstock and the insect species used.

Frass has been applied in solid form or in liquid form as a tea (Tan et al. (2021) Applications of food waste-derived black soldier fly larval frass as incorporated compost, side-dress fertilizer and frass-tea drench for soilless cultivation of leafy vegetables in biochar-based growing media. *Waste Management* 130:155-166). A benefit of applying the frass in solid form is that it may be applied immediately to the soil and can be mixed into the soil or applied as a top-dressing, which makes its use suitable for both container and field crops. Applying frass in solid form also results in more concentrated nutrients such as nitrogen, phosphorus, potassium, and calcium that can directly benefit plants through root uptake of these nutrients (Chavez and Uchanski (2021) Insect left-over substrate as plant fertiliser. *Journal of Insects as Food and Feed* 7(5):683-694).

Applying frass as a tea requires more time and specialized equipment to ensure the correct conditions for brewing, with major considerations including the proportion of solid frass to water, water quality, water temperature, oxygenation, and length of brewing. Additional considerations include application method (e.g., drip irrigation, overhead irrigation, or in-furrow application) and timing of application with respect to crop growth stage. However, the benefits of applying frass as a tea include the ability to cover larger areas with a smaller amount of product, the ability to treat above-ground growth (i.e., using a foliar spray) in addition to the root zone, and the ability to mix liquid applications with compatible products including fertilizers and pesticides (Scheuerell and Mahaffee (2002) Compost tea: Principles and prospects for plant disease control. *Compost Science & Utilization* 10(4): 313-338). An additional benefit of brewing frass in tea form is the ability to multiply the existing microbial population in the frass by providing suitable environmental conditions and using the resulting tea as a microbial inoculant to support soil and plant health and production (Ingham (2005). *The Compost Tea Brewing Manual*, 5$^{th}$ ed. 91 pp.).

BSF frass has been thought to have numerous potential uses in agriculture, including as a feeding stimulant for hybrid tilapia (Yildirim-Aksoy et al. (2020) Use of dietary frass from black soldier fly larvae, *Hermetia illucens*, in hybrid tilapia (Nilex Mozambique, *Oreocromis niloticus* × *O. mozambique*) diets improves growth and resistance to bacterial diseases. *Aquaculture Reports* 17: 100373 https://doi.org/10.1016/j.aqrep.2020.100373), a plant health promoter (Schmitt and de Vries (2020) Potential benefits of using *Hermetia illucens* larvae frass as a soil amendment on food production and for environmental impact reduction. *Current Opinion in Green and Sustainable Chemistry*, https://doi.org/10.1016/j.cogsc.2020.03.005, organic fertilizer (Choi et al. (2009) Potential Usage of Food Waste as a Natural Fertilizer after Digestion by *Hermetia illucens* (Diptera: Stratiomyidae). *Int. J. Indust. Entomol.* 19(1): 171-174 and US Patent Appln. Pub. No. US20210137137A1), and microbial inoculant (Boraste et al. (2009) Biofertilizers: a novel tool for agriculture. *International Journal of Microbiology Research* 1(2): 23-31). Furthermore, BSF frass has been found to possess some insecticidal, and antifungal properties (reviewed in Chavez and Uchanski (2021) Insect left-over substrate as plant fertiliser. *Journal of Insects as Food and Feed* 7(5): 683-694) and U.S. Pat. No. 9,844,223 (wireworms) and Choi, and Hassanzadeh, (2019) BSFL Frass: a novel biofertilizer for improving plant health while minimizing environmental impact. *The Canadian Science Fair Journal* 2: 41-46) (*Pythium*)).

An additional component of frass is chitin, which occurs naturally in insect exoskeletons and is of particular interest for its potential uses in biomedicine (Wasko et al. (2016) The first report of the physicochemical structure of chitin isolated from *Hermetia illucens*. *International Journal of Biological Macromolecules* 92: 316-320), feed additives (Jayanegara et al. (2020) Derivatization of Chitin and Chitosan from Black Soldier Fly (*Hermetia illucens*) and Their Use as Feed Additives: An *In vitro Study. Advances in Animal and Veterinary Sciences* 8(5): 472-477), and agriculture (Shahrajabian et al. (2021) Sustainable agriculture systems in vegetable production using chitin and chitosan as plant biostimulants. *Biomolecules* 11: 819, https://doi.org/10.3390/biom11060819). Numerous mechanisms may exist for chitin's actions on pests, including inducing changes to the soil microbiome to favor antipathogenic species (Schmitt and de Vries (2020) Potential benefits of using *Hermetia illucens* larvae frass as a soil amendment on food production and for environmental impact reduction. Current Opinion in Green and Sustainable Chemistry, https://doi.org/10.1016/j.cogsc.2020.03.005) or by acting as a plant biostimulant (Shahrajabian et al. (2021) Sustainable agriculture systems in vegetable production using chitin and chitosan as plant biostimulants. *Biomolecules* 11: https://doi.org/10.3390/biom11060819). In relation, BSF frass has also been reported to improve plant and soil health by means of its unique microbiology and chitin content (Schmitt and de Vries (2020) Potential benefits of using *Hermetia illucens* larvae frass as a soil amendment on food production and for environmental impact reduction. *Current Opinion in Green and Sustainable Chemistry*, https://doi.org/10.1016/j.cogsc.2020.03.005), both of which may be used to supplement soil fertility and pest control practices.

Although a number of studies have shown BSF frass to benefit crop and soil health (Boaru et al. (2018) Studies regarding the fertilizing capacity of poultry manure biocomposted by fly larvae (Diptera:Stratiomyidae). *AAB Bioflux*. 10(3): 114-121; Chavez and Uchanski (2021) Insect left-over substrate as plant fertiliser. *Journal of Insects as Food and Feed* 7(5): 683-694), there are still limitations to its widespread adoption as a soil amendment or fertilizer. One major limitation is availability: there are relatively few large-scale producers of BSF, which limits the volume of frass available to agricultural producers for use on field or specialty crops (Niyonsaba et al. (2021) Profitability of insect farms. *Journal of Insects as Food and Feed* 7(5): 923-934). Secondly, BSF frass composition, including macronutrient, micronutrient, and chitin contents, as well as microbiological activity, can vary widely depending upon the diet and conditions in which the BSF larvae are reared (Schmitt and de Vries (2020) Potential benefits of using *Hermetia illucens* larvae frass as a soil amendment on food production and for environmental impact reduction. *Current Opinion in Green and Sustainable Chemistry*, https://doi.org/10.1016/j.cogsc.2020.03.005; Klammsteiner et al. (2020) Suitability of Black Soldier Fly Frass as Soil Amendment and Implication for Organic Waste Hygienization. *Agronomy* 10: 1578: doi:10.3390/agronomy10101578). Such variations can make it difficult for farmers to interchange sources of frass based on their commercial availability and can also lead to regulatory hurdles when registering a frass-based product for agricultural use. Thirdly, the limited availability of consistent frass sources in the commercial fertilizer market may result in many farmers being hesitant to use it due to its unfamiliarity and potential for large variances in quality and performance.

It is therefore an object to produce a black soldier fly larvae frass formulation in a cost-effective manner and with a consistent composition and with effective uses.

SUMMARY

Provided is a black soldier fly (*Hermetia illucens*) larvae (BSFL) frass formulation comprising by weight nitrogen in the amount of about 1% to about 3%, phosphorous in the amount of about 1% to about 6%, potassium in the amount of about 1% to about 6%, calcium in the amount of about 9% to about 16% and chitin in the amount of at least about 4%. The formulation may further comprise at least one functional group of microbes and/or at least about $1\times10^7$ CFU/ml of total bacteria and/or dried larvae.

The term "black soldier fly" and "*Hermetia illucens*" are used interchangeably. "Frass" as defined herein is the sum of all larval excrement, including shed larval exoskeletons and miscellaneous particles that are derived from the feedstock itself, including but not limited to granite, eggshells, and feather pieces, in addition to microbiota that originate from the larvae, their feedstock, and the environment. In a specific embodiment, said formulation is pathogen-free as determined by a *Salmonella* and fecal coliform test and has a shelf life of at least about 15 months.

In a more particular embodiment, said formulation comprises by weight nitrogen in the amount of about 1.4 to about 2.7%, phosphorous in the amount of about 2.0% to about 5.3%, potassium in the amount of about 2.7% to about 5.0%, calcium in the amount of about 10.8% to about 14.6% and chitin in the amount of about 4% to about 25%.

In yet a more particular embodiment, said formulation comprises by weight nitrogen in the amount of about 1.5%-2.5%, phosphorous in the amount of about 4.0% to about 5.0%, potassium in the amount of about 4.0% to about 5.0%, calcium in the amount of about 10.8% to about 14.6% and chitin in the amount of about 15% to about 20%. In a more specific embodiment, the formulation has a composition by weight of about 1.9% to about 2.4% nitrogen, about 4.7% to about 5.3% phosphorous, about 4.7% to about 5.3% potassium, about 14-15% calcium and about 15% to about 25% chitin.

In another embodiment, the formulation may further comprise dried black soldier fly larvae. In a more specific embodiment, the ratio of frass to larvae by weight is between about 3:1 to 6:1 and even in a more specific embodiment may be about 5:1.

Also provided is a method for obtaining said formulation. In a particular embodiment, the method comprises: (1) providing black soldier fly larvae; (2) feeding said black soldier fly larvae provided in (1) with a manure formulation for a time sufficient for said black soldier fly larvae to produce frass; (3) separating frass produced by said fed black soldier fly larvae from said larvae; (4) composting said separated frass for a time sufficient to remove pathogenic species and (5) drying said composted frass. In a specific embodiment, the time of feeding in step (2) ranges about 8 to about 14 days.

The formulation set forth above may be in solid form or liquid form, also referred to as a "tea" or "brew". In a particular embodiment, the liquid formulation is in the form of an oxygenated infusion of *Hermetia illucens* larvae frass formulation with non-chlorinated water. In another embodiment, the non-chlorinated water may further contain a sugar source, such as sucrose, molasses, fructose, or glucose. In a further embodiment, the non-chlorinated water may further contain a plant metabolite or agricultural by-product, such as pectin, sugar cane bagasse or wine must. The term "frass formulation infusion" and "frass tea" shall be used interchangeably. In a particular embodiment, said frass may be present in the amount of at least about 3 g/L aqueous solution. In a more particular embodiment said frass is present in the amount of about 3.5 g/L to about 11.5 g/L aqueous solution. In yet another particular embodiment, said tea comprises ranges about 1,000,000 CFU/mL to about 16,000,000,000, and in a further particular embodiment, said tea comprises about 500,000,000 CFU/ml of total bacteria and 2 ug/ml of active bacteria.

In yet a further embodiment, said formulation is stable for at least about two years under controlled product storage conditions, which in one embodiment, comprises ambient storage temperature of about 50 degrees F. to about 70 degrees F. and relative humidity of less than about 50%, and shielded from light (in a sheltered location or in a dark/opaque container.

In yet another further embodiment said formulation comprises at least one of the functional groups (groups of microbes that are classified by structure and/or function) including but not limited to spore formers, (e.g., *Bacillus* spp., *Brevibacillus* spp., *Paenibacillus* spp., *Geobacillus* spp); cellulose degraders, microorganisms that can produce cellulase enzymes (cellulolytic microorganisms) that can degrade cellulose and are commonly produced by bacterial genera including but not limited to *Cellulomonas, Pseudomonas, Bacillus, Pedobacter, Micrococcus, Sphingobacterium*, and fungi from genera including, but not limited to, *Trichoderma, Penicillium, Aspergillus, Fusarium, Chaetomium*; halophilic bacteria, a group of organisms that can thrive in environments with high salt concentrations, (e.g., *Halobacterium, Haloactinobacterium, Halococcus, Bacillus, Lactobacillus*), phosphorous (P) solubilizers, microorganisms such as bacteria and fungi that can convert insoluble P into soluble P, thereby improving the absorption and use of soil P by plants (e.g., *Pseudomonas, Bacillus, Agrobacterium, Paenibacillus, Enterobacter, Rhizobium, Rhodococcus, Bradyrhizobium*, and fungi, *Penicillium, Trichoderma, Aspergillus*); chitin utilizers, microorganisms that can produce chitinase enzymes (chitinolytic microorganisms)(e.g., *Streptomyces, Pedobacter, Flavobacterium, Bacillus, Pseudomonas*, and fungi, *Aspergillus, Mucor, Mortierella*), nitrifying bacteria, that can convert ammonium compounds into nitrites or change nitrites into nitrates as part of the nitrogen cycle (e.g., *Nitrosomonas, Nitrobacter, Rhizobium, Bradyrhizobium, Pseudomona, Bacillus, Fluviicola, Devosia*), and heterotrophic bacteria, important to biodegradation and recycling processes, (e.g., *Pseudomonas, Bacillus, Rhizobium, Rhodobacteria, Paracoccus*) and fluorescent Pseudomonads, which are associated with plant growth and disease suppression. All of the functional groups may be detected and measured using well-known microbial culturing (see Examples 9 and 13 for examples of assays) and counting techniques such as plate counts or spectrophotometry.

In a particular embodiment, said formulation comprises at least about 1000 CFU/ml of a particular functional group. In yet another particular embodiment, said formulation may comprise between about $1 \times 10^3$ CFU/ml to about $1 \times 10^8$ CFU/ml of a particular functional group.

Also provided are combinations comprising the frass formulation set forth above and one or more other substances, which other substance(s) is at least one of an herbicide, fungicide, nematicide, bactericide, fertilizer and/or soil amendment. The other substance may be organic or synthetic. An organic substance is a substance derived from living organisms and in a specific embodiment, a living organism never treated or fed with synthetic/chemical compounds. A synthetic substance is a substance that is man-made and not found in nature. In a particular embodiment, the combination is in the form of a composition. In an even more particular embodiment, the volumetric ratio of another substance to said formulation is from about 1:1 to 1:800. In yet another particular embodiment, the volumetric ratio of said frass formulation to said other substance is between about 1:10 to about 1:200 when said other substance is an herbicide. In yet even another particular embodiment, the volumetric ratio is between about 1:100 to about 1:80 when said other substance is a fungicide.

Various uses of the frass formulations and combinations set forth above are also provided. In a particular embodiment, provided is the use of said formulations and/or combinations for promoting and/or stimulating and/or improving plant performance. In a more particular embodiment, provided is a method for promoting and/or simulating plant and/or improving performance. In a more particular embodiment, provided is the use of said formulations and/or combinations for promoting or simulating plant growth and/or plant health/and or plant yield.

In yet another particular embodiment, provided is a method for promoting and/or stimulating and/or improving plant performance, comprising applying the frass formulation or combination set forth above to a plant growth medium, a plant, a plant seed in an amount effective to promote and/or stimulate and/or improve plant performance In a more particular embodiment, said method may be used to promote plant growth and/or plant health and/or plant yield.

The plant may be an agricultural crop, ornamental plant or turfgrass. As used herein, the term "agricultural crop" generally refers to plants of which a part or all is harvested or cultivated on a commercial scale or which serve as an important source of feed, food, fibers (e.g., cotton, linen), combustibles (e.g., wood, bioethanol, biodiesel, biomass) or other chemical compounds. Examples of crops include, but are not limited to, grains, fruits and fruit trees, and vegetables, such as cereals, e.g., wheat, rye, barley, triticale, oats, sorghum or rice; beet, e.g., sugar beet or fodder beet; leguminous plants, such as lentils, peas, alfalfa, clover or soybeans; oil plants, such as rape, oil-seed rape, canola, *juncea* (*Brassica juncea*), linseed, mustard, olives, sunflowers, cocoa beans, castor oil plants, oil palms, ground nuts, almonds, peanuts or soybeans; cucurbits, such as squashes, cucumber or melons; fiber plants, such as cotton, flax, hemp or jute; vegetables, such as cucumbers, spinach, lettuce, asparagus, cabbages, carrots, onions, tomatoes, potatoes, cucurbits or paprika; lauraceous plants, such as avocados, cinnamon or camphor; fruits such as *citrus* fruits or berries; nuts such as almonds and peanuts; energy and raw material plants, such as corn, soybean, rape, canola, sugar cane or oil palm, tobacco, nuts, coffee, tea, vines, hop, turf and natural rubber plants; *Cannabis*, including but not limited to *Cannabis sativa, Cannabis indica, Cannabis ruderalis*. In a particular embodiment, said agricultural crop may include but is not limited to wheat, alfalfa, sunflower, peanuts, strawberries, Bermuda grass, rye grass, fescue, tomato, corn, sorghum, cotton, lemon, soybean, orange and/or grapefruit. In yet more a particular embodiment, said agricultural crop may include but is not limited to tomato, corn, sorghum, cotton, lemon, soybean, orange and/or grapefruit.

As used herein, the term "ornamental plant" generally refers to plants that are cultivated (on a commercial scale) for ornamental/decorative purposes, e.g., ornamental garden plants and decorative flowers. Examples of ornamental plants include but are not limited to African violet, alstreomeria, aster, azalea, begonia, cacti, calceolaria, celosia, cineraria, cyclamen, chrysanthemum, dalia, exacum, gladiolus, geranium, gerbera, gloxinia, gypsophila, hibiscus, hydrangea, impatiens, kalanchoe, lily, lisianthus, oxalis, primula, petunia, poinsettia, rose, snapdragon, stocks, and stephanotis.

The terms "promoting plant performance", "improving plant performance" and "stimulating plant performance" are used interchangeably herein and can be measured by the ability to enhance or increase and refers to plant growth/plant health and/or plant yield. In a particular embodiment, the plant is a crop and yield is the amount of crop harvested/acre.

The terms "promoting plant growth", "improving plant performance" and "stimulating plant growth" are used interchangeably herein and refers to the ability to enhance or increase at least one of the plant's height, weight, leaf size, root size, fruit size or stem size and/or the ability to increase nutrient uptake, plant biomass, plant growth promoting bacteria, protein yield from the plant, increased plant growth hormone production and/or to increase crop yield.

As defined herein, 'plant health" refers to one or more advantageous properties of a plant, including but not limited to emergence, crop yield, protein content, more developed root system (improved root growth), improved root biomass, increased number of root tips; increase in plant height, increase in size of leaf, in particular, the leaf blade, fewer dead basal leaves and/or fruit, stronger tillers, greener leaf color, greater photosynthetic activity, decreased need for fertilizer, decrease in need for seeds, earlier flowering, earlier grain maturity, increased shoot growth, enhanced plant vigor, increased nutrient uptake and/or nutrient content, decreased susceptibility to an environmental biotic and abiotic stress conditions (e.g., drought, flood, heat, freezing salt, heavy metals, low pH and/or high pH, pathogens), decreased stress related hormones pathways (another indicator of increased stress tolerance).

In a particular embodiment, "plant health" may also refer to "crop quality". Thus, in a related aspect said frass formulation may be used to improve crop quality and in another related aspect, provided is a method for promoting and/or improving crop quality comprising applying said formulation to soil in an amount effective to promote and/or improve crop quality. Crop quality may be measured using methods known in the art. In a particular embodiment, the crop is cotton and as set forth in Example 13, crop quality may be determined according to USDA standards (see 7 CFR 28 (PART 28—COTTON CLASSING, TESTING, AND STANDARDS, Subpart C-Standards) https://www.govinfo.gov/content/pkg/CFR-2018-title7-vol2/xml/CFR-2018-title7-vol2-part28.xml#seqnum28.105). In particular, the classification system for American Upland cotton comprises of class identification of extraneous matter (if any) and instrument measurements for color grade, leaf grade, length, micronaire (resistance to air flow per unit mass and measures fineness), fiber strength, length uniformity index which measures the degree of uniformity of the fibers in a sample, color Rd, color +b, and trash percent area.

As defined herein, "a fertilizer" is a substance that improves the supply of nutrients in the soil, directly affecting plant growth. Soil characteristics are a key factor affecting crop response to fertilizer and hence the profitability of and demand for fertilizer. Specifically, the physical, biological and chemical characteristics of soils strongly influence the amounts of nutrients that can be stored and released, water availability, and the ability of plants to take-up nutrients. Further, plant growth promoting bacteria (PGPB) present in the soil also influences plant immunity, health and growth performance.

Also provided is the use of said formulation and/or combination comprising said formulation and at least one of a fertilizer and/or soil amendment for promoting and/or improving soil health. In a related aspect, also provided is a method for promoting and/or improving soil health comprising applying the frass formulation set forth above and/or combination comprising said formulation and at least one of a fertilizer and/or soil amendment in an amount effective to promote and/or improve soil health. The terms "promoting soil health" and "improving soil health" may be used interchangeably. As defined herein a "soil amendment" improves a soil's physical condition (e.g., soil structure, water infiltration). As defined herein, "soil health" means an intrinsic characteristic of the soil defined as the continued capacity of soil to function as a vital living system, within ecosystem and land-use boundaries, to sustain biological productivity, maintain on enhance the quality of air and water, and promote plant, animal and human health. Soil health can more generally pertain to the composition of nutrients, minerals and/or microorganisms and/or its water content in addition to the biodiversity of life in the soil. In a particular embodiment, soil health may be improved by at least one of increased macronutrient levels (e.g., N and P release and/or availability and K availability, Ca, sulfur, Mg); increased micronutrient levels (e.g., Zn, Fe, Mn, Cu), increased microbially active carbon (% MAC), increased total soil aggregates, water holding capacity (WHC), and/or permanganate oxidizable carbon (POXC), the biologically active carbon fraction of the soil, increase in microbial biomass, increased soil microbiome biodiversity and activity and increases in the population of beneficial microorganisms such as fungi that inhibit plant parasitic nematodes, microorganisms that sequester carbon and enhance nitrogen, phosphorous and calcium uptake. Consequently, soil regeneration of topsoil may be accelerated compared to conventional farming practices (such as tillage, soil disturbance, increased use of chemicals and fertilizers, etc.). Ways to quantify rate or degree of regeneration include measuring soil health metrics, e.g., water holding capacity, organic carbon, microbiome diversity and microbial biomass and measuring these parameters over time to show increases as indicators of improved soil health (see, for example, Examples 6 and 13).

The formulation and/or combinations set forth above may be used for modulating the emergence and/or growth of monocotyledonous, sedge or dicotyledonous weeds, phytopathogenic fungi, phytopathogenic bacteria and/or modulating nematode infestation in a plant. Thus, in yet another embodiment, provided is a method for modulating the emergence and/or growth of monocotyledonous, sedge or dicotyledonous weeds, phytopathogenic fungi, phytopathogenic bacteria and/or modulating nematode infestation in a plant comprising applying the black soldier fly larvae frass formulation to said plant and/or seeds thereof and/or plant growth substrate or plant growth medium used for growing said plant and/or weeds an amount of a black soldier fly larvae frass formulation or combination set forth above effective to modulate said nematode infestation and/or emergence or growth of monocotyledonous, sedge or dicotyledonous weeds or phytopathogenic fungal or bacterial growth. In particular embodiments, a combination comprising the formulation set forth above and (a) one or more herbicides could be used to modulate the emergence and/or growth of weeds; (b) one or more fungicides could be used to modulate phytopathogenic fungal infestation in a plant; (c) one or more bactericides could be used to modulate phytopathogenic bacteria infestation in a plant; (d) one or nematicides could be used to modulate nematode infestation in a plant.

In a particular embodiment, the phytopathogenic fungus may be derived from *Botrytis, Colletotrichum, Rhizoctonia, Epicoccum* and *Fusarium*. In particular, said fungus may be derived from *Botrytis cinerea, Colletotrichum coccodes, Rhizoctonia solani, Fusarium cerealis, Fusarium avenaeseum, Fusarium graminearum, Fusarium oxysporum, Fusarium sambucum* or *Epicoccum nigrum*.

In another particular embodiment, the nematode may be derived from *Meloidogyne* spp., *Rotylenchulus* spp, *Heterodera* spp. In yet another more particular embodiment, the nematode may be derived from *Meloidogyne incognita, Rotylenchulus reniformis, Heterodera glycines*.

As defined herein, "a plant growth medium" treated using the methods set forth above is a substance through which plant roots grow and extract water and nutrients. It may be soil-based or organic-based, a base of organic materials that may be compost, peat, coconut coir, or other organic materials, mixed with inorganic ingredients). The term "plant growth medium" can be used interchangeably with "plant growth substrate" or "plant substrate". In a particular embodiment, the plant growth medium may be soil.

In a related aspect to the methods set forth above, said formulation set forth above may be used to reduce soil amendment, fertilizer, herbicide, fungicide, nematicide or bactericide use without reduction to plant yield compared to standard fertilizer, herbicide, fungicide, nematicide or bactericide use comprising applying the frass formulation set forth above in combination with said soil amendment, fertilizer, herbicide, fungicide, bactericide or nematicide to plant growth medium, a plant, and/or plant seed.

In another particular embodiment, provided is the use of said formulation for increasing or improving the effectiveness of soil amendment, fertilizer, herbicide, pesticide, fungicide or nematicide use compared to standard fertilizer, herbicide, fungicide, bactericide or nematicide use. Thus, provided is a method for increasing the effectiveness of soil amendment, fertilizer, herbicide, pesticide, fungicide or nematicide use compared to standard fertilizer, herbicide, fungicide, bactericide or nematicide use comprising applying the formulation of set forth in combination with said soil amendment, fertilizer, herbicide, bactericide fungicide or nematicide to plant growth medium, a plant, and/or a plant seed.

DETAILED DESCRIPTION OF SPECIFIC EMBODIMENTS

Figure 1:
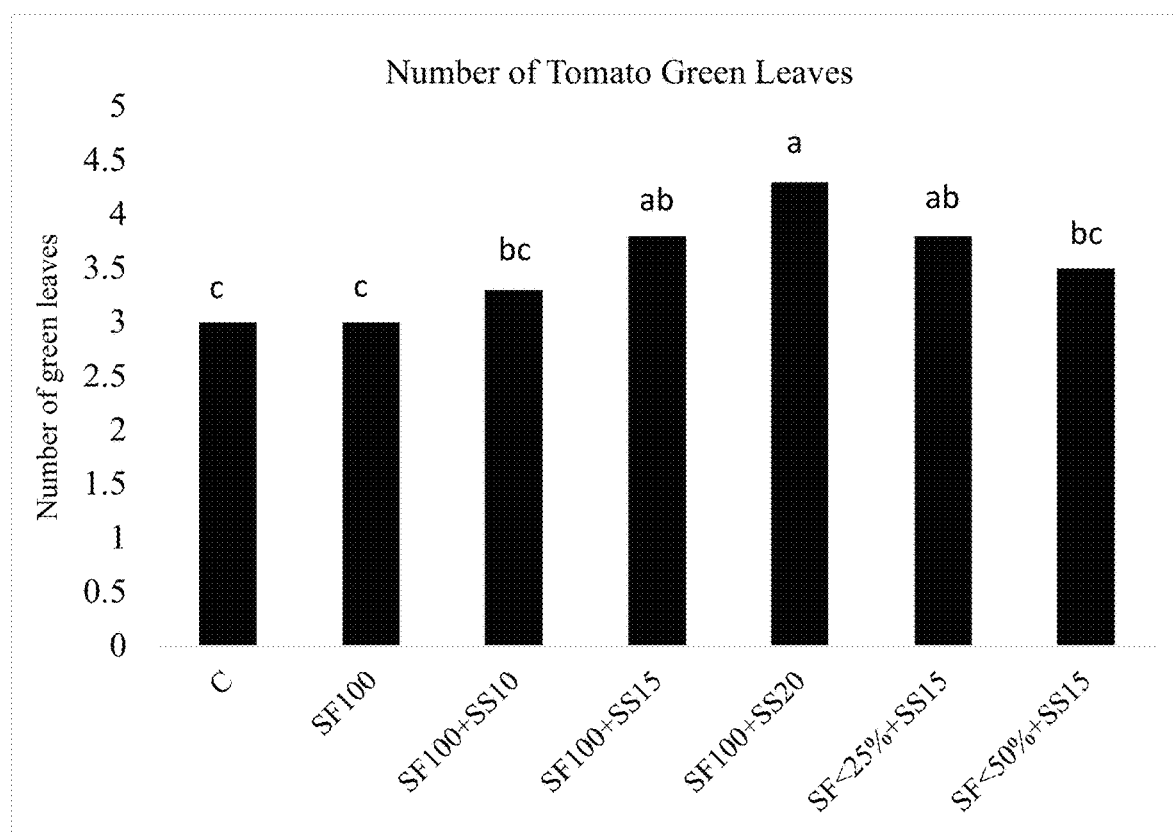
FIG. 1 shows the effect of *H. illucens* larvae frass tea alone and in combination with synthetic fertilizer on the number of tomato green leaves. (C), Untreated check; (SF100) Synthetic fertilizer; (SF100+SS10) Synthetic fertilizer+2 *H. illucens* larvae frass tea app (10 gal/ac); (SF100+SS15) Synthetic fertilizer+2 *H. illucens* larvae frass tea app (15 gal/ac); (SF100+SS20) Synthetic fertilizer+2 *H. illucens* larvae frass tea app (20 gal/ac); (SF<25%+SS15) 25% reduction Synthetic fertilizer+2 *H. illucens* larvae frass tea app (15 gal/ac); (SF<50%+SS15) 50% reduction Synthetic fertilizer+2 *H. illucens* larvae frass tea app (15 gal/ac). Different letters indicate statistically significant differences ($p<0.05$).

As set forth above, provided is a (*Hermetia illucens*) larvae frass formulation and combinations comprising said formulations and another substance including but not limited to soil amendment, fertilizer, herbicide, pesticide, fungicide, nematicide or bactericide, uses for said formulations and combinations and methods of production of said formulation.

Production of *Hermetia illucens* Larvae Frass Formulation

As set forth above, said formulation may be in the form of a solid or in a liquid.

Production of *Hermetia illucens* Larvae Frass Solid Formulation

*Hermetica illucens* larvae in a particular embodiment, are fed feedstock which may include, but is not limited to pre-consumer or post-consumer food waste (e.g., expired or past due packaged food, produce, deli waste, bakery waste), food processing by-products (e.g., brewery grains, produce, fish trimmings) and/or manure. The manure may be derived from livestock manure. In a particular embodiment, the manure may be hen manure. In a more particular embodiment, the feedstock is manure which may be modified by adding a lipid source. Such a lipid source may include, but is not limited to, fish oil, vegetable oil, used cooking oil In a particular embodiment, after about 8-14 days of feeding, frass may be separated from the larvae using methods known in the art, which include, but are not limited to, mechanical and/or behavioral means. Separated frass may be further processed by a time and temperature-sensitive process to remove potential pathogens and dry the product. In a particular embodiment, it is dried to below about 10-15% moisture content using composting and subsequently drying procedures known in the art. The nutrient composition of the formulation is determined using methods known in the art. As set forth above, said formulation has a black soldier fly larvae frass formulation wherein black soldier fly larvae frass comprises by weight nitrogen in the amount of about 1% to about 3%, phosphorous in the amount of about 1% to about 6%, potassium in the amount of about 1% to about 6%, calcium in the amount of about 9% to about 16% and chitin in the amount of at least about 4%. In a more specific embodiment, said formulation has the following composition by weight: total nitrogen: about 1.4%-2.4%; total phosphorus (e.g., $P_2O_5$), about 2.0%-5.3%; total potassium (e.g., $K_2O$), about 2.7%-5.00%; total calcium 10.8%-14.6% at a pH between about 9 to about 10. In a particular embodiment, said formulation does not contain any detectable levels of pathogen as determined by a *Salmonella* and fecal coliform test, and has a shelf life of above 15 months.

In addition, as set forth above, the *Hermetia illucens* larvae frass formulation contains an amount of chitin, particularly insect-derived chitin in amounts effective to change the microbiome and/or act as a biostimulant. In particular embodiments, said chitin is derived from BSF larval exoskeleton and/or dried larvae. The amount of chitin may be determined by methods known in the art, which may include, but is not limited to, ADF-ADL method (see, for example, Hahn (2018) New methods for high-accuracy insect chitin measurement, *J. Sci. Food Agric.* 98(13):5069-5073) or alternatively determining nitrogen content using assays known in the art, such as the ninhydrin colorimetric assay for detecting nitrogen containing compounds, particularly amines after removing soluble nitrogen containing compounds. The formulations provided may in a particular embodiment comprise up to about 30% exoskeleton and/or whole dried larvae by weight.

Production of *Hermetia illucens* Larvae Frass Formulation Infusion

*Hermetia illucens* larvae frass formulation infusion ("tea") is obtainable by creating an oxygenated infusion of *Hermetia illucens* larvae frass formulation with non-chlorinated water. Dried *Hermetia illucens* larvae frass formulation may be measured at a ratio of around or above 3 g/L. The dried product may be placed directly into a water tank, or more alternatively, may be placed into a mesh brew bag that is then placed into a water tank in order to contain solid particles. Aeration is provided during the brewing process, which may last between about 24 to about 60 hours, with in a particular embodiment an air pump, resulting in an oxygen concentration of about 6 to about 10 ppm. In one embodiment, aeration of the water occurs prior to addition of the frass formulation to provide additional oxygen and encourage the evaporation of chlorine from the water. *Hermetia illucens* larvae frass formulation infusion may be brewed at a water temperature ranging about 60-85 degrees Fahrenheit and the pH level above 5.5.

In one embodiment, *Hermetia illucens* larvae frass formulation is brewed as the sole ingredient of the tea. However, in certain situations, a sugar source may be added to the water tank at a rate of about 1-2 cups per 250 gallons to provide an additional food source for bacteria, fungi and protozoa of formulation to water.

At the end of the designated brewing time, in a particular embodiment, a time sufficient for the infusion to comprise at least about 1,000,000 CFU/mL the *Hermetia illucens* larvae frass formulation infusion may be filtered if needed to remove small particles. At this point the tea may be tank-mixed with other products such as pesticides or herbicides if they are determined to be physically and chemically compatible. Compatibility is determined by comparing the bacteria population in frass treated areas vs. frass+herbicide/pesticide treated areas, such as the jar test using methods known in the art (see, for example, https://onvegetables.com/2013/04/11/tank-mix-pesticide-compatibility-jar-test/).

Combinations

The formulation set forth above may be used in combination with another substance. This other substance may be an organic or synthetic substance. This other substance may be a soil amendment, fertilizer, bactericide, fungicide, herbicide and/or nematicide. Organic and synthetic substances have been defined above.

In a particular embodiment, the soil amendment may be an organic or inorganic nutrient source, which may include, but is not limited to, humic and fulvic acids, bone meal, bone char, biosolids, biochar, dried molasses, kelp, rice hulls, organic feather meal, soy hydrolysate and rock phosphate compost. In a more particular embodiment, the amendment is humic acid and/or bone meal.

In another particular embodiment, the fertilizer may be an organic fertilizer which may include, but is not limited to, fulvic acid, acetic acid, botanicals, seaweed, manure, blood-meal, feather meal, fishmeal and products derived therefrom. The fertilizer may be alternatively a synthetic fertilizer which includes but is not limited to an NPK fertilizer where NPK is present in the amount (% by weight) of about 10-0-10, 0-10-0, or about 0-10-0 to about 50-85-85 or UAN (urea/ammonium nitrate) which in a particular embodiment, comprises between about 25-35% urea and about 35-45% ammonium nitrate. NPK may be obtainable by blending diammonium phosphate, potassium chloride and urea which are all widely available from many agricultural suppliers, such as Mosaic Crop Nutrition) wherein NPK is present in the amount of about 40-80-80 or from commercial sources such as Lebanon Seabord Corp., Lebanon, PA, Stoller® group, Yara International such as Greenview®, wherein NPK is present in the amount of about 10-10-10 (% by weight) Lebanon Seabord Corp., Lebanon, PA), Harvest More® 20-20-20 (N—P—K, % w/w) from Stoller® group, YaraRega™ 20-5-18 (N—P—K, % w/w) and YaraMila™ 21-7-14 (N—P—K, % w/w), both from Yara International. UAN may be obtainable by blending urea and ammonium nitrate, which are also widely available, in water or may be obtainable from commercial sources. In a particular embodiment, UAN is UAN 28, UAN 30, UAN32 and UAN 18.

The herbicide may include, but is not limited to, an organic herbicide selected from the group consisting of capric and caprylic acids, fatty acids, ammoniated salts of fatty acids, essential oils such as peppermint oil, orange oil, d-limonene and clove oil, other natural plant extracts and substances such as long black pepper extract, sarmentine, and microbial herbicides based on but not limited to *Pseudomonas, Streptomyces, Bacillus*, and *Burkholderia*. Alternatively, the herbicide may be a synthetic herbicide selected from the group consisting of aryloxyphenoxypropionic herbicides (e.g., chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop); benzoic acid herbicides (e.g., chloramben, dicamba, 2,3,6-TBA and tricamba); benzofuranyl alkylsulfonate herbicides (e.g., benfuresate and ethofumesate); benzoylcyclohexanedione herbicides (e.g., mesotrione, sulcotrione, tefuryltrione and tembotrione); carbamate herbicides (e.g., asulam, carboxazole chlorprocarb, dichlormate, fenasulam, karbutilate and terbucarb); carbanilate herbicides (e.g., barban, BCPC, carbasulam, carbetamide, CEPC, chlorbufam, chlorpropham, CPPC, desmedipham, phenisopham, phenmedipham, phenmedipham-ethyl, propham); cyclohexene oxime herbicides (e.g., alloxydim, butroxydim, clethodim, cloproxydim, cycloxydim, profoxydim, sethoxydim, tepraloxydim and tralkoxydim); cyclopropylisoxazole herbicides (e.g., isoxachlortole and isoxaflutole); dicarboximide herbicides (e.g., benzfendizone, cinidon-ethyl, flumezin, flumiclorac, flumioxazin and flumipropyn); dinitroaniline herbicides (e.g., benfluralin, butralin, dinitramine, ethalfluralin, fluchloralin, isopropalin, methalpropalin, nitralin, oryzalin, pendimethalin, prodiamine, profluralin and trifluralin); dinitrophenol herbicides (e.g., dinofenate, dinoprop, dinosam, dinoseb, dinoterb, DNOC, etinofen and medinoterb); dithiocarbamate herbicides (e.g., dazomet and metam; halogenated aliphatic herbicides such as alorac, chloropon, dalapon, flupropanate, hexachloroacetone, iodomethane, methyl bromide, monochloroacetic acid, SMA and TCA); imidazolinone herbicides (e.g., imazamethabenz, imazamox, imazapic, imazapyr, imazaquin and imazethapyr); inorganic herbicides (e.g., ammonium sulfamate, borax, calcium chlorate, copper sulfate, ferrous sulfate, potassium azide, potassium cyanate, sodium azide, sodium chlorate and sulfuric acid); nitrophenyl ether herbicides (e.g., acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen and oxyfluorfen); nitrile herbicides (e.g., bromobonil, bromoxynil, chloroxynil, dichlobenil, iodobonil, ioxynil and pyraclonil); organophosphorus herbicides (e.g., amiprofos-methyl, anilofos, bensulide, bilanafos, butamifos, 2,4-DEP, DMPA, EBEP, fosamine, glufosinate, glyphosate and piperophos); phenoxy herbicides (e.g., bromofenoxim, clomeprop, 2,4-DEB, 2,4-DEP, difenopenten, disul, erbon, etnipromid, fenteracol and trifopsime); phenoxyacetic herbicides (e.g., 4-CPA, 2,4-D, 3,4-DA, MCPA, MCPA-thioethyl and 2,4,5-T); phenoxybutyric herbicides (e.g., 4-CPB, 2,4-DB, 3,4-DB, MCPB and 2,4,5-TB); phenoxypropionic herbicides (e.g., cloprop, 4-CPP, dichlorprop, dichlorprop-P, 3,4-DP, fenoprop, mecoprop and mecoprop-P); phenylenediamine herbicides (e.g., dinitramine and prodiamine); picolinic acid herbicides (e.g., aminopyralid, clopyralid and picloram); pyrazolyl herbicides (e.g., benzofenap, pyrazolynate, pyrasulfotole, pyrazoxyfen, pyroxasulfone and topramezone); pyrazolylphenyl herbicides (e.g., fluazolate and pyraflufen; pyridazine herbicides such as credazine, pyridafol and pyridate); pyridazinone herbicides (e.g., brompyrazon, chloridazon, dimidazon, flufenpyr, metflurazon, norflurazon, oxapyrazon and pydanon); pyridine herbicides (e.g., cliodinate, dithiopyr, fluroxypyr, haloxydine, picolinafen, pyriclor, thiazopyr and triclopyr); pyrimidinediamine herbicides (e.g., iprymidam and tioclorim); quaternary ammonium herbicides (e.g., cyperquat, diethamquat, difenzoquat, diquat, morfamquat and paraquat); pyrimidinyloxybenzoic acid herbicides (e.g., bispyribac and pyriminobac); thiocarbamate herbicides (e.g., butylate, cycloate, di-allate, EPIC, esprocarb, ethiolate, isopolinate, methiobencarb, molinate, orbencarb, pebulate, prosulfocarb, pyributicarb, sulfallate, thiobencarb, tiocarbazil, triallate and vemolate); sulfonamide herbicides (e.g. asulam, carbasulam, fenasulam, oryzalin, penoxsulam, pyroxsulam); triazine herbicides (e.g., dipropetryn, triaziflam and trihydroxytriazine, atrazine, chlorazine, cyanazine, cyprazine, eglinazine, ipazine, mesoprazine, procyazine, proglinazine, propazine, sebuthylazine, simazine, terbuthylazine and trietazine, atraton, methometon, prometon, secbumeton, simeton and terbumeton; ametryn, aziprotryne, cyanatryn, desmetryn, dimethametryn, methoprotryne, prometryn, simetryn and terbutryn); triazinone herbicides (e.g., ametridione, amibuzin, hexazinone, isomethiozin, metamitron and metribuzin); triazolopyrimidine herbicides (e.g., chloransulam, diclosulam, florasulam, flumetsulam, metosulam); urea herbicides (e.g., benzthiazuron, cumyluron, cycluron, dichloralurea, diflufenzopyr, isonoruron, isouron, methabenzthiazuron, monisouron and noruron; anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron and thidiazuron; amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron; chlorsulfuron, cinosulfuron, ethametsulfuron, iodosulfuron, metsulfuron, prosulfuron, thifensulfuron, triasulfuron, tribenuron, triflusulfuron and tritosulfuron; buthiuron, ethidimuron, tebuthiuron, thiazafluron and thidiazuron), In a particular embodiment, the herbicide may be an organophosphorus herbicide, wherein said organophosphorus herbicide may include but is not limited to amiprofos-methyl, anilofos, bensulide, bilanafos, butamifos, 2,4-DEP, DMPA, EBEP, fosamine, glufosinate, glyphosate or piperophos, a phenoxyacetic herbicide, wherein said phenoxyacetic herbicide may include but is not limited to 4-CPA, 2,4-D, 3,4-DA, MCPA, MCPA-thioethyl and 2,4,5-T) or a triazine herbicide, wherein said triazine herbicide may include but is not limited to dipropetryn, triaziflam, trihydroxytriazine, atrazine, chlorazine, cyanazine, cyprazine, eglinazine, ipazine, mesoprazine, procyazine, proglinazine, propazine, sebuthylazine, simazine, terbuthylazine and trietazine, atraton, methometon, prometon, secbumeton, simeton and terbumeton; ametryn, aziprotryne, cyanatryn, desmetryn, dimethametryn, methoprotryne, prometryn, simetryn and terbutryn. In a most specific embodiment, the herbicide may be glyphosate, 2,4-D or atrazine.

The fungicide may be, in an embodiment, selected from the group consisting of (a) a single site anti-fungal agent, wherein said single-site anti-fungal agent is selected from the group consisting of benzimidazole, morpholine, hydroxypyrimidine, anilinopyrimidine, phosphorothiolate, quinone outside inhibitor, quinoline, dicarboximide, carboximide, phenylamide, anilinopyrimidine, phenylpyrrole, aromatic hydrocarbon, cinnamic acid, hydroxyanilide, antibiotic, polyoxin, acylamine, phthalimide, benzenoid (xylylalanine); (b) a demethylation inhibitor selected from the group consisting of imidazole, piperazine, pyrimidine, and triazole, and (c) a multi-site non-inorganic, chemical fungicide selected from the group consisting of a nitrile, copper, quinoxaline, sulphamide, phosphonate, phosphite, dithiocarbamate, chloralkythios, phenylpyridin-amine, cyano-acetamide oxime, fludioxonil and mefenoxam. In a particular embodiment, the fungicide may be strobilurin and wherein said strobilurin is azoxystrobin, kresoxim-methoyl or trifloxystrobin. The fungicide may also be an organic, natural fungicide selected from the group consisting of but not limited to *Bacillus* such as *subtilis*, *amyloliquefaciens*, *nakamurai*, *velensis* and others, *Pseudomonas fluorescens*, *Pseudomonas chlororaphis*, and *Streptomyces lydicus*.

The nematicide may include, but is not limited to, fenamiphos, Fluensulfone, aldicarb, oxamyl, carbofuran, avermectin, fluopyram, metam sodium, picloram, 1,3-D, *Quillaja* extract, chitosan and other shellfish waste/extracts, fungi *Pochonia* spp. *Paecilomyces lilacinus*, and *Muscodor* spp., bacteria *Bacillus* spp., *Pasteuria penetrans*, *Burkholderia rinojensis*, and *Chromobacterium* substage.

Uses

As set forth above, the formulations and/or combinations provided can be used to improve/stimulate and/or promote plant performance. In a particular embodiment, said formulation and/or combinations can be used to stimulate and/or promote at least one of plant growth, plant yield or plant health. They may also be used to promote and/or improve soil health. In yet another embodiment, the formulations and/or combinations may be used to modulate weed emergence and/or growth of monocotyledonous, sedge or dicotyledonous weeds. Said weeds may include but are not limited to grass weeds or broadleaved weeds. Said formulations and/or combinations (formulation+herbicide) may be applied prior to weed emergence and would thus be applied to plant growth medium or substrate or alternatively after weed emergence where said formulation and/or combination would be applied to either the plant growth medium and/or said weed.

In yet another embodiment, said formulations and/or combinations (formulation+fungicide) may be used to modulate phytopathogenic fungus, bacterial or nematode infestation.

In a particular embodiment the phytopathogenic fungus is a member of the genus selected from *Botrytis, Colletotrichum, Rhizoctonia, Phytophthora, Pythium, Verticillium, Epicoccum* and *Fusarium*. In a more specific embodiment, the fungus is selected from *B. cinerea, C. coccodes R. solani, F. cerealis, F. avena, F. graminearum, F. oxysporum*, and *Epicoccum nigrum*.

In yet another embodiment, the nematode is a member of the genus selected from *Meloidogyne Rotylenchulus* and *Heterodera*. In yet another more specific embodiment, the nematode is selected from *Meloidogyne incognita, Rotylenchulus reniformis* and *Heterodera glycines*.

In a particular embodiment, the frass formulation may be used to increase the efficacy (alternatively referred to as "the effectiveness") of one or more substances. In a related aspect, use of the frass formulation along with the one or more other substances may result in reducing the amount of other substance(s) that need to be used. In a particular embodiment, the other substance may be a fertilizer.

When combinations are applied for the uses set forth above, they may be applied concurrently or as a composition. Alternatively, the frass formulation and the other substance(s) can be applied separately. In one embodiment, the frass formulation may be applied before the other substance(s). Alternatively, it may be applied after the other substance(s). The formulation may be applied to the growth medium pre-emergence and/or post emergence (e.g., vegetative, flowering stage) (see Examples 2, 3, 4, 10, 12 for specific embodiments).

The formulation set forth above may be applied in solid or liquid form. When applied in solid form, the formulation may be applied prior to planting, and again post-planting. In one embodiment, the formulation is applied via broadcasting the dried mixture over a prepared area. In another embodiment, the formulation is applied at a rate of at least about 2 T per hectare and in a particular embodiment between about 2.5 to about 5 T per hectare.

Alternatively, the formulation may be applied in the form of a liquid. In particular, it may be applied in the form of a tea, an oxygenated aqueous infusion. In particular, the tea may be present in the amount of at least about 3 g/L aqueous solution. In a more particular embodiment said frass is present in the amount of about 3.5 g/L to about 11.5 g/L aqueous solution. The tea may then be applied as either a soil drench, in furrow or a foliar spray in an amount of at least about 1 gallon per acre. In a particular embodiment, said tea is applied in the amount of about 1 gallon per acre to about 40 gallons per acre. In another particular embodiment, said tea is applied in the amount of about 5 gallons per acre to about 40 gallons per acre. In a more particular embodiment, said tea is applied in the amount of about 5 gallons per acre, 10 gallons per acre, 20 gallons per acre, 30 gallons per acre and/or 40 gallons per acre.

The formulations and combinations set forth above may be applied to either the growth medium or substrate (e.g., soil), plant itself, seed or weed. If applied to the plant, it could be applied to plant parts growing above ground, particularly leaves. The plant may be an agricultural crop or ornamental plant.

EXAMPLES

Example 1: Black Soldier Fly Larvae (BSFL) Frass Formulations and their Effect on Plant Growth The Example set forth herein described various BSFL formulations and their applications.

Dried frass: 100% dried BSFL frass

Superfrass: Dried larvae (25%) and dried frass (75%). Dried larvae were ground in a food processor prior to blending.

Turf Blend: Dried BSFL frass (70%), granular humic acid (20%), and spray-dried kelp (*Ascophyllum nodosum*, 10%).

"Premium Blend": Dried BSF frass (60%), organic feather meal (20%), granular humic acid (10%), and spray-dried kelp (10%).

Samples of each blend have the following nutrient analysis (performed by laboratory analysis or calculations) shown in Table I below:

TABLE 1

Nutrient Analysis of Frass Formulation

| Product name | Nutrient Analysis(% w/w) |
|---|---|
| Dried frass | 2-5-5 |
| Superfrass (dried frass + dried larvae) | 2-5-4.5 |
| Turf Blend (dried frass + kelp + humic acid) | 1.5-4-4.5 |
| Premium Blend | 4-3-4.5 |

The blends were field applied by broadcasting the dried mixture over a prepared area once prior to planting, and again four weeks later, at the rates shown in Table 2 below.

TABLE 2

Application Rates

| Product name | Application rate (lbs/1000 sq. ft.) |
|---|---|
| Dried frass | 100 |
| Superfrass | 100 |
| Turf Blend | 100 |
| Premium Blend | 52 |

The demo plots were used to grow various vegetables including corn, summer squash, zucchini, purple hull peas, and okra. Both the superfrass and the turf blend produced favorable results in plant size, color, and yield.

Example 2: Black Soldier Fly Larvae Frass Tea/Fertilizer Combinations—Effect on Plant Performance

Example 2a: Tomatoes

The Example set forth herein describes results from studies with tomato. Different *Hermetia illucens* larvae frass tea application rates in combination with synthetic fertilizer (SF) applications were evaluated.

Materials and Methods

*Solanum lycopersicum* plants were tested in plots 10 by 30 feet, 4 replicates for each treatment were tested. Synthetic fertilizer was applied in a pre-emergent stage in all cases. 1 lb/25 gallons of water was the *Hermetia illucens* larvae frass tea (alternatively referred to as SS) dosage. The synthetic fertilizer used was 40-80-80 (NPK pre-emergence synthetic fertilizer, and an application of 20 lb urea post-emergence, and is referred to as SF.

Treatments tested are detailed below.

Untreated check (control)—Untreated plants.

Synthetic fertilizer 100% (referred to as SF100)—(40-80-80 (NPK) was applied pre-emergence to meet the selected NPK ratio over the treated acreage and similarly an application of urea post-emergence to meet the selected NPK ratio over the treated acreage.

SF100+2 app. *Hermetia illucens* larvae frass tea (SS10)—Plants were treated with SF100 with two SS applications (10 gal/ac), the first 15 days after emergence and the second application 65 days after emergence (flowering).

SF100+2 app. SS (SS15)—Plants were treated with SF100 with two SS tea applications (15 gal/ac) the first 15 days after emergence and the second application 65 days after emergence (flowering).

SF100+2 app. SS (SS20)—Plants were treated with SF100 with two SS tea applications (20 gal/ac), the first 15 days after emergence and the second application 65 days after emergence (flowering).

75% of Synthetic Fertilizer (referred to alternatively as SF75 or SF<25%)+2 app. SS (SS15), with a volume that was 75% of that used in the SF100 40-80-80 NPK application. Plants were treated with SF75 with two *Hermetia illucens* larvae frass tea applications (15 gal/ac), the first 15 days after emergence and the second application 65 days after emergence (flowering).

50% of Synthetic Fertilizer (referred to alternatively as SF50 or SF<50%)+2 app. SS (SS15), with a volume that was 50% of that used in the SF100 40-80-80 NPK application. Plants were applied with 50% reduction on synthetic fertilizer (SF50) with two *Hermetia illucens* larvae frass tea application (15 gal/ac) first 5 days after emergence and second application 65 days after emergence (flowering).

Plant performance was evaluated in terms of number on green leaves, plant height and yield.

Results

Number of green leaves. In all cases when *H. illucens* larvae frass tea was applied, higher number of green leaves were obtained, Plants treated with synthetic fertilizer (SF100)+2 app of *H. illucens* 20 gal/ac showed the best performance (FIG. 1).

Figure 2:
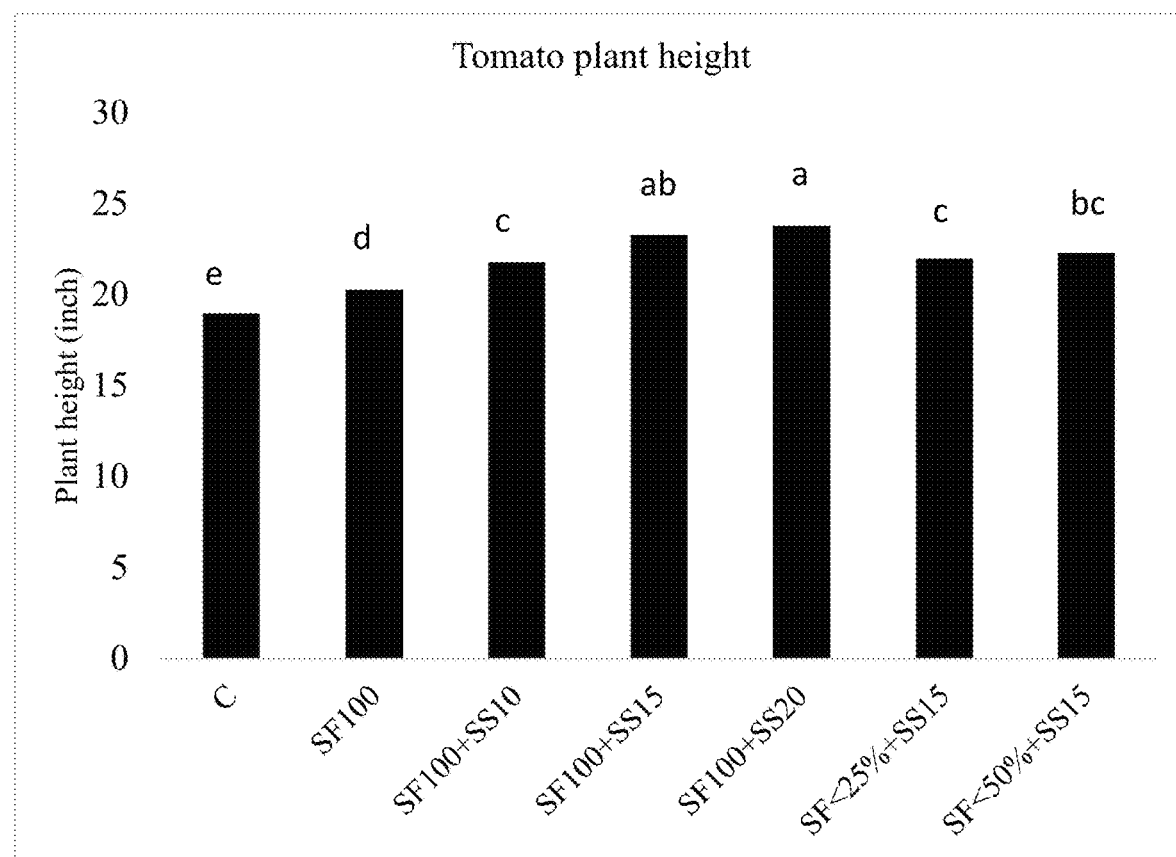
FIG. 2 shows the effect of the effect of *H. illucens* larvae frass tea alone and in combination with synthetic fertilizer on tomato plant height. (C), Untreated check; (SF100) Synthetic fertilizer; (SF100+SS10) Synthetic fertilizer+2 *H. illucens* larvae frass tea app (10 gal/ac); (SF100+SS15) Synthetic fertilizer+2 *H. illucens* larvae frass tea app (15 gal/ac); (SF100+SS20) Synthetic fertilizer+2 *H. illucens* larvae frass tea app (20 gal/ac); (SF<25%+SS15) 25% reduction Synthetic fertilizer+2 *H. illucens* larvae frass tea app (15 gal/ac); (SF<50%+SS15) 50% reduction Synthetic fertilizer+2 *H. illucens* larvae frass tea app (15 gal/ac). Different letters indicate statistically significant differences ($p<0.05$).

Plant height, in all cases when *H. illucens* larvae frass tea was applied, better plant height was observed. Plants treated with synthetic fertilizer+2 app of *H. illucens* 20 gal/ac showed the best performance (FIG. 2), Under synthetic fertilizer reduction treatments supplemented with *H. illucens* larvae frass tea, the plant height was similar to plants just treated with synthetic fertilizer+2 app. *H. illucens* larvae frass tea 10 gal/ac. Untreated plant heights were less with respect to plants treated with synthetic fertilizer (FIG. 2).

Figure 3:
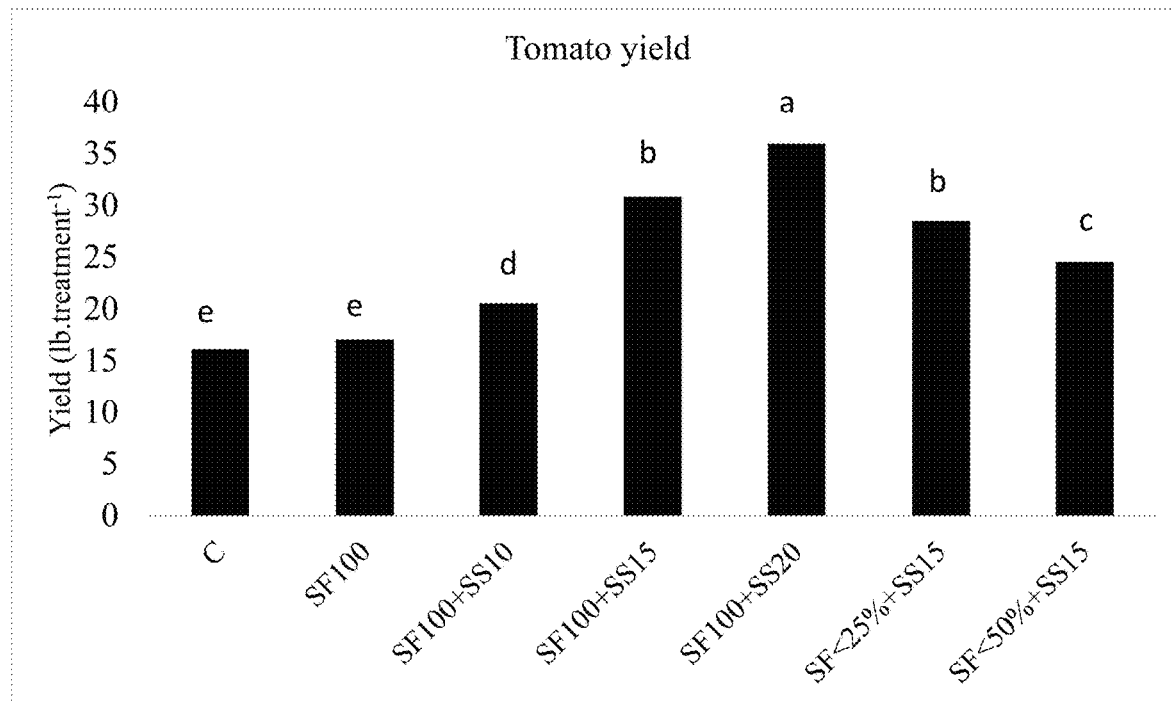
FIG. 3 shows the effect of *H. illucens* larvae frass tea alone and in combination with synthetic fertilizer on tomato yield. (C), Untreated check; (SF100) Synthetic fertilizer; (SF100+SS10) Synthetic fertilizer+2 *H. illucens* larvae frass tea app (10 gal/ac); (SF100+SS15) Synthetic fertilizer+2 *H. illucens* larvae frass tea app (15 gal/ac); (SF100+SS20) Synthetic fertilizer+2 *H. illucens* larvae frass tea app (20 gal/ac); (SF<25%+SS15) 25% reduction Synthetic fertilizer+2 *H. illucens* larvae frass tea app (15 gal/ac); (SF<50%+SS15) 50% reduction Synthetic fertilizer+2 *H. illucens* larvae frass tea app (15 gal/ac). Different letters indicate statistically significant differences ($p<0.05$).
Figure 4A:
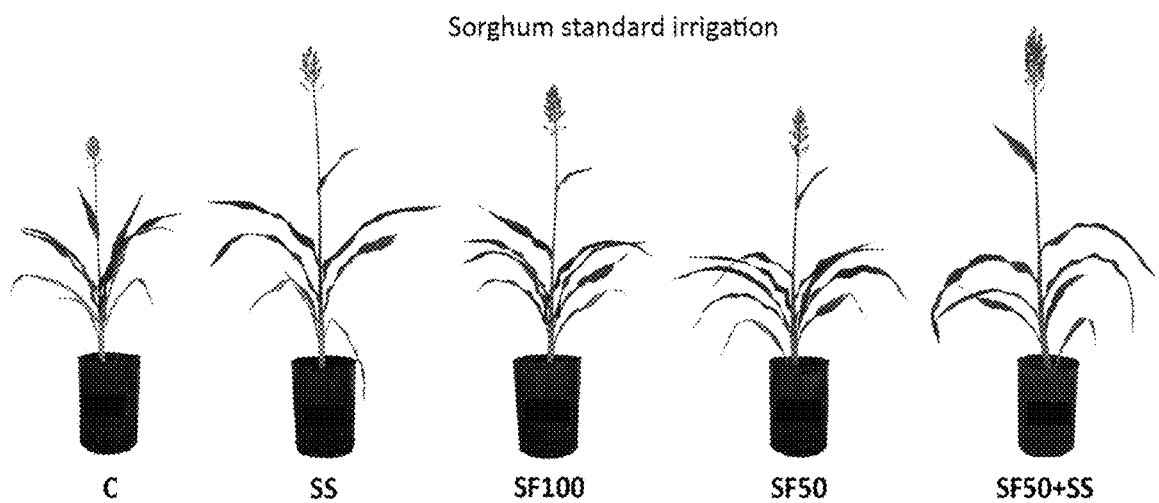
FIGS. 4a-e show the effect of *H. illucens* larvae frass tea alone and in combination with synthetic fertilizer on growth of sorghum (FIGS. 4a-b) under standard irrigation (FIG. 4a) and reduced irrigation (FIG. 4b) conditions and sorghum panicle development under both standard and reduced irrigation conditions (FIG. 4c) and growth of tomato plants under standard irrigation (FIG. 4d) and reduced irrigation (FIG. 43) conditions. C, Control untreated plants; SS, plants treated with *Hermetia illucens* larvae frass tea; SF100, plants fertilized with 100% of synthetic fertilizer; SF50, plants fertilized with 50% of synthetic fertilizer; SF50+SS, plants fertilized with 50% of synthetic fertilizer+*Hermetia illucens* larvae frass tea.
Figure 4B:
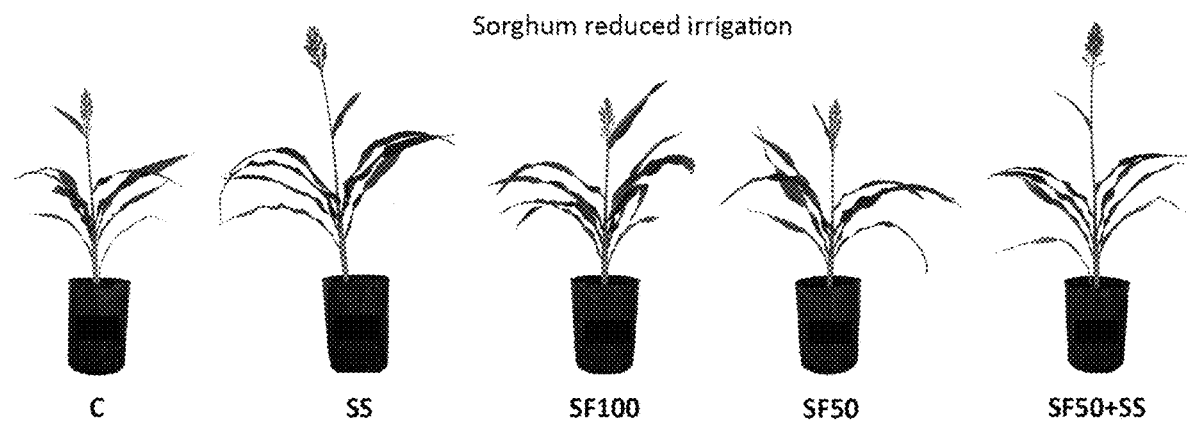
Figure 4C:
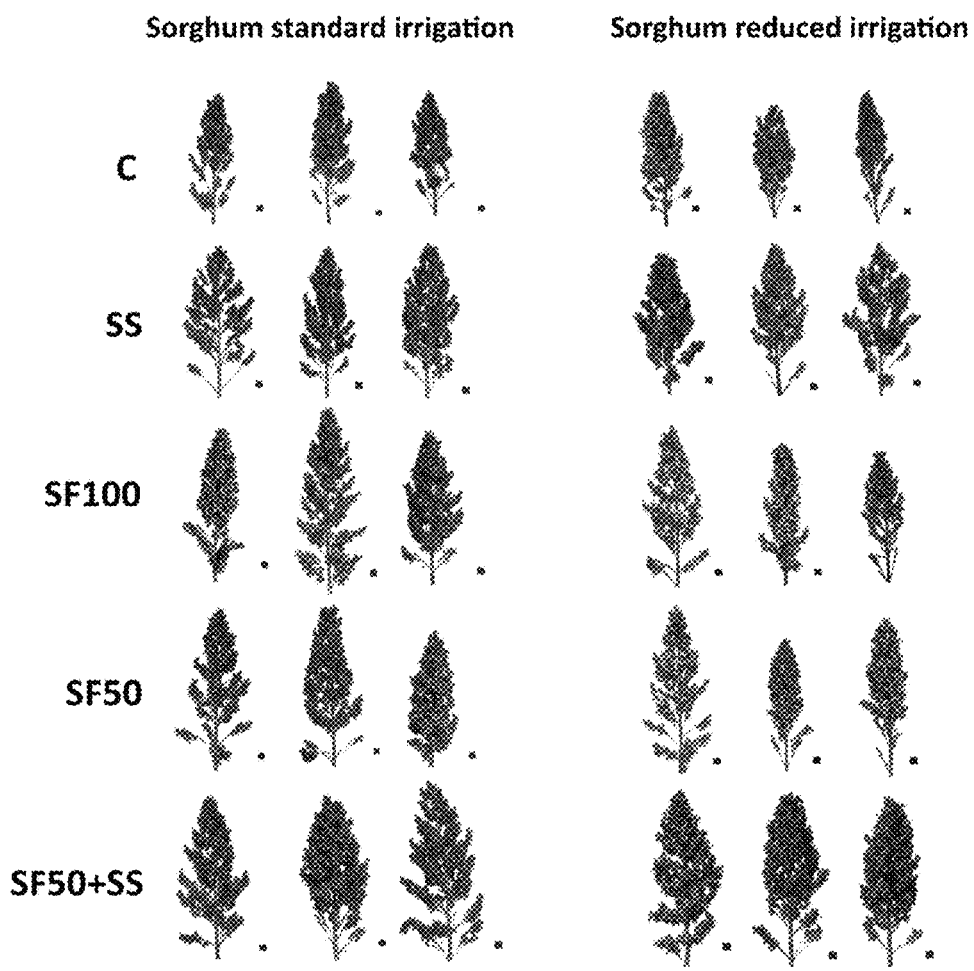
Figure 4D:
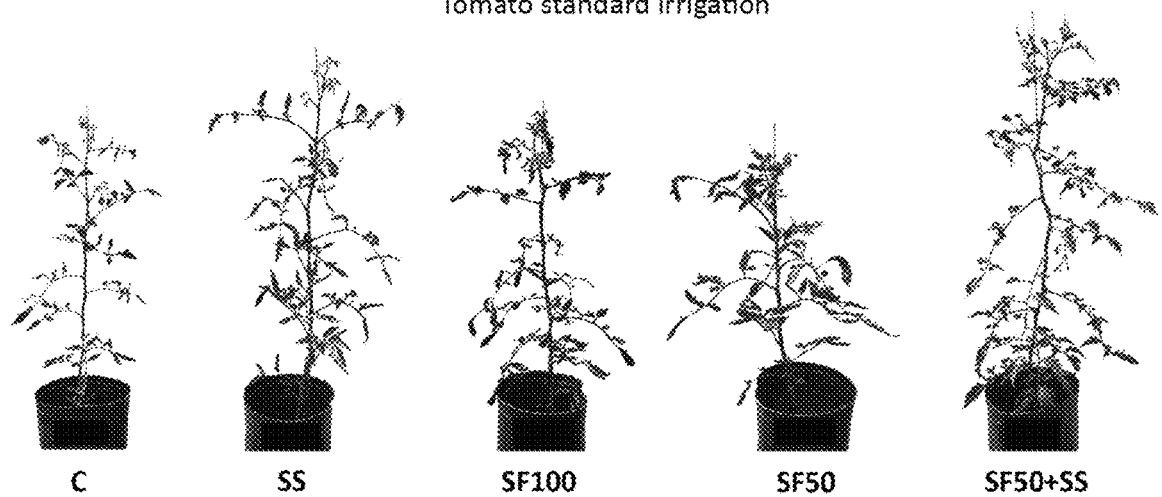
Figure 4E:
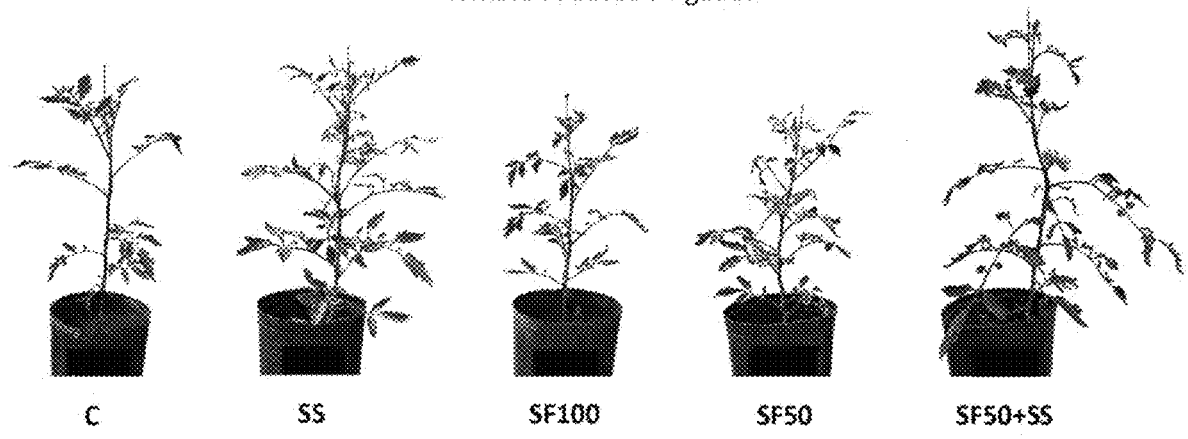

Yield. The best yield (tomato fresh weight) was achieved with synthetic fertilizer (SF100)+2 app *H. illucens* larvae frass tea 20 gal/a (SS20). Synthetic fertilizer reduced 25% (SF<25%)+2 app *H. illucens* larvae frass tea 15 gal/a showed the same yield with respect to Synthetic fertilizer 1-2 app *H. illucens* larvae frass tea 15 gal/a, Plants treated with synthetic fertilizer reduced 50% (SF<50%)+2 app *H. illucens* larvae frass tea 15 gal/a (SS15) had even better performance than plants treated with synthetic fertilizer (SF100). Synthetic fertilizer (SF100)+*H. illucens* larvae frass tea 10 gal/ac showed better yield as compared to Synthetic fertilizer (SF100) and untreated plants (FIG. 3).

Example 2b: *Citrus*

Lemon plants (*Citrus limon*) were tested in treated and untreated blocks. The effect of *Hermetia illucens* larvae frass tea on plant yield was evaluated.

Materials and Methods

*Hermetia illucens* larvae frass infusion (tea) (SS tea) 0.1 lb of *Hermetia illucens* larvae frass was mixed with 2.5 gal of water and brewed for 48 hs. at room temperature using a constant aeration always between 6-10 ppm $O_2$. After 48 hrs. *Hermetia illucens* larvae frass tea was applied at each site.

Mature lemon plants (*Citrus limon*) were tested in 23.7 acres divided in 2 blocks. 20 gal/acre/application of SS tea was applied three times during the year by injecting it into the irrigation network by microjet system.

Results

Lemon yield, treated block yield after three applications was 342 boxes/acre and untreated block yield was 302 boxes/acre. There was a 13% increase in yield after SS tea applications in one year.

Example 2c: *Citrus*—Lemon, Orange and Grapefruit

Lemon (*Citrus limon*), orange (*Citrus sinensis*) and grapefruit (*Citrus grandis*) new plantations are tested in blocks. The effect of *Hermetia illucens* larvae frass tea on plant yield is evaluated.

Materials and Methods

*Hermetia illucens* larvae frass infusion (tea) (SS tea) 0.1 lb of *Hermetia illucens* larvae frass is mixed with 2.5 gal of water and brewed for 48 hs. at room temperature using a constant aeration always between 6-10 ppm $O_2$. After 48 hrs., *Hermetia illucens* larvae frass tea is applied at each site.

Lemon (*Citrus limon*), orange (*Citrus sinensis*) and grapefruit (*Citrus grandis*) plants are tested. One hundred and fifty plants separated into three blocks of fifty plants are treated with SS tea. During planting, the young trees are watered using approximately 32 oz of the SS tea. 20 gal/acre is applied three times during the year. SS tea is injected into the irrigation network by microjet system.

In this example, there are treated and untreated block and untreated blocks. *Citrus* yield and soil health are measured.

Example 3: *H. illucens* Larvae Frass Tea Effect on Plant Health-Study #2

In the example described herein, the effect of *Hermetica illucens* larvae frass tea on plant performance and yield was evaluated. Furthermore, the effect of *Hermetica illucens* larvae frass tea application during synthetic fertilizer application reduction was analyzed and the effect of *Hermetia illucens* larvae frass tea application under standard and reduced irrigation programs was evaluated.

Materials and Methods

Plant species used. Sorghum (*Sorghum* hybrid GENE 11-T) and tomato (*Tomate platense*) were tested.

*Hermetia illucens* larvae frass infusion. 0.1 lb of *Hermetia illucens* larvae frass was mixed with 2.5 gal of water and brewed for 48 hrs. at room temperature using a constant aeration always between 6-10 ppm $O_2$.

Synthetic fertilizer applications. Harvest More® 20-20-20 fertilizer (N—P—K, % w/w) from Stoller® group was used for synthetic fertilizer applications following the manufacturer's recommendation (see http://stollercalifornia.com/product/harvest-more-20-20-20/#). Synthetic fertilizer was used for SF100 and SF50 treatments.

Irrigation program. Under a standard irrigation program, plants were watered every day. Under a reduced irrigation program, plants were watered every other day.

Experimental conditions and treatments. The trials were carried under greenhouse conditions. Treatments included on this trial are detailed below.

Control (without any synthetic fertilizer) (C)

SS. *Hermetia illucens* larvae frass tea

SF100. Synthetic fertilizer 100% means Harvest More® 20-20-20 fertilizer (N—P—K, % w/w) from Stoller® group applied at 5 lbs. per acre in 100 gal. water, every 7-14 days throughout the growing season.

SF50. Synthetic fertilizer 50% means applying a volume that was 50% of that used in the SF100 NPK Harvest More® 20-20-20 fertilizer (N—P—K, % w/w) from Stoller® group.

SF50+SS. Synthetic fertilizer 50%+*Hermetia illucens* larvae frass tea.

Each treatment includes 8 individual plants per pot. All treatments were performed under standard and irrigation programs for both species. Pots of 7 L were filled soil having a standard nutrient profile. *Hermetia illucens* larvae frass tea application was evaluated to determine its effect on plant physiology response. Furthermore, the effect of synthetic fertilizer (SF) applications was compared to *H. illucens* larvae frass tea and control plants without any fertilizer applications.

Results

Root establishment. *Hermetia illucens* larvae frass tea application was found to promote a higher number of root tips and overall root mass during standard and reduced irrigation programs in *Sorghum* plants This response also means *H. illucens* larvae frass tea enhances nutrient uptake.

Nutrient uptake. *H. illucens* larvae frass tea was found to enhance nutrient uptake under both irrigation programs. In order to visualize this effect, biomass accumulation (Table 3) in sorghum and grain protein content) (Table 4) was measured. In particular, *Hermetia illucens* larvae frass tea was found to enhance sorghum biomass accumulation in all tissues. When *Hermetia illucens* larvae frass tea was added to synthetic fertilizer 50% (SF50), those plants had a higher biomass amount than plants supplied with 100% synthetic fertilizer under reduced irrigation program and the same amount with respect to SF100 under standard irrigation program (see Table 3).

TABLE 3

Sorghum standard and reduced irrigation biomass accumulation

|  |  | DW leaf ($g \cdot pl^{-1}$) | DW stem ($g \cdot pl^{-1}$) | DW root ($g \cdot pl^{-1}$) | DW panicle ($g \cdot pl^{-1}$) | Total DW ($g \cdot pl^{-1}$) |
| --- | --- | --- | --- | --- | --- | --- |
| Sorghum standard irrigation | C | 4.7 | 6.3 | 18.6 | 2.5 | 32.1 |
|  | SS | 5.5 | 9.1 | 28.7 | 3.0 | 46.3 |
|  | SF100 | 8.9 | 10.5 | 35.1 | 3.4 | 57.9 |
|  | SF50 | 8.5 | 9.9 | 35.3 | 3.0 | 56.7 |
|  | SF50 + SS | 8.4 | 12.3 | 32.1 | 4.6 | 57.4 |
| Sorghum reduced irrigation | C | 5.2 | 5.7 | 22.7 | 2.6 | 36.3 |
|  | SS | 7.0 | 8.9 | 30.4 | 4.1 | 50.4 |
|  | SF100 | 8.4 | 7.6 | 45.4 | 2.2 | 63.5 |
|  | SF50 | 8.7 | 7.9 | 36.8 | 2.2 | 55.6 |
|  | SF50 + SS | 8.9 | 9.1 | 44.2 | 3.5 | 65.8 |

C, Control untreated plants;
SS, plants treated with *Hermetia illucens* larvae frass tea;
SF100, plants fertilized with 100% of synthetic fertilizer;
SF50, plants fertilized with 50% of synthetic fertilizer;
SF50 + SS, plants fertilized with 50% of synthetic fertilizer + *Hermetia illucens* larvae frass tea.

TABLE 4

Sorghum standard and reduced irrigation protein content

|  |  | Protein content (protein · dry matter$^{-1}$) |
| --- | --- | --- |
| Sorghum standard irrigation | C | 8.51 |
|  | SS | 10.06 |
|  | SF100 | 14.40 |
|  | SF50 | 14.40 |
|  | SF50 + SS | 14.29 |
| Sorghum reduced irrigation | C | 7.89 |
|  | SS | 9.92 |
|  | SF100 | 15.67 |
|  | SF50 | 13.69 |
|  | SF50 + SS | 15.10 |

C, Control untreated plants; SS, plants treated with *Hermetia illucens* larvae frass tea; SF100, plants fertilized with 100% of synthetic fertilizer; SF50, plants fertilized with 50% of synthetic fertilizer; SF50 + SS, plants fertilized with 50% of synthetic fertilizer + *Hermetia illucens* larvae frass tea.

*Hermetia illucens* larvae frass tea response in tomato trials showed the same patterns. *H. illucens* larvae frass tea was found to enhance tomato leaf and stem biomass accumulation. Plants treated with *H. illucens* larvae frass tea added to SF50 had a higher biomass than plants supplied with SF100 under both irrigation programs (Table 5).

TABLE 5

Tomato standard and reduced irrigation biomass accumulation

|  |  | DW leaf ($g \cdot pl^{-1}$) | DW stem ($g \cdot pl^{-1}$) |
| --- | --- | --- | --- |
| Tomato standard irrigation | C | 7.88 | 7.14 |
|  | SS | 15.19 | 10.82 |
|  | SF100 | 23.90 | 11.16 |
|  | SF50 | 22.40 | 11.98 |
|  | SF50 + SS | 28.93 | 17.04 |
| Tomato reduced irrigation | C | 6.82 | 5.50 |
|  | SS | 15.44 | 12.57 |
|  | SF100 | 11.74 | 6.69 |
|  | SF50 | 15.44 | 7.26 |
|  | SF50 + SS | 24.16 | 11.19 |

C, Control untreated plants; SS, plants treated with *Hermetia illucens* larvae frass tea; SF100, plants fertilized with 100% of synthetic fertilizer; SF50, plants fertilized with 50% of synthetic fertilizer; SF50 + SS, plants fertilized with 50% of synthetic fertilizer + *Hermetia illucens* larvae frass tea.

Carbon fixation. To evaluate the *H. illucens* larvae frass tea effect on photosynthesis, performance index (PI) and Brix grades (in tomato trials) were measured.

Performance Index (PI) was measured using a Pocket PEA, Hansatech. High PI means a better plant photosystem performance. Six different datapoints on six different dates were measured between about 12-21 days. The first dataset did not show differences between treatments in either the tomato or sorghum studies. Differences between treatments were observed in almost all cases from the second dataset. It should be noted that in the sorghum studies, under standard irrigation. *H. illucens* larvae frass tea showed a better PI with respect to control from the third dataset until the last one. When *H. illucens* larvae frass tea was combined with SF50 treatment, those differences were higher with respect to untreated sorghum plants. The same pattern was observed in sorghum plants under a reduced irrigation program. In tomato trials under standard irrigation conditions, a higher PI was observed from the third dataset with *H. illucens* larvae frass tea treatment until the last one than with control untreated plants. When *H. illucens* larvae frass tea was combined with SF50, those differences were higher as compared to untreated plants. Furthermore, the same PI values were obtained with SF50+SS and SF100 treatment. A better PI was observed after *H. illucens* larvae frass tea application from the second dataset until the last one with respect to control untreated plants in tomato trials under reduced irrigation. When *H. illucens* larvae frass tea was combined with SF50, greater differences were observed with respect to untreated control plants The PI values of tomato plants treated with S50+SS and SF100 were similar.

The Brix grade of tomato plants was measured using a refractometer. Brix grade is an indicator of sugar content. Tomatoes with a higher Brix grades tomatoes are sweeter (Table 6). *Hermetia illucens* larvae frass tea improved tomato Brix grades. This means, more sugar content was on mature tomatoes during standard and reduced irrigation programs. In terms of physiology *H. illucens* larvae frass tea achieved a better sugar load in the sink tissues with respect to control plants.

Table 6. Tomato Standard and Reduced Irrigation: Brix Grades

TABLE 6

Tomato standard and reduced irrigation: Brix grades

|  |  | Brix grade |
|---|---|---|
| Tomato standard irrigation | C | 5.66 |
|  | SS | 7.23 |
|  | SF100 | 8.81 |
|  | SF50 | 8.56 |
|  | SF50 + SS | 8.80 |
| Tomato reduced irrigation | C | 6.59 |
|  | SS | 7.68 |
|  | SF100 | 9.07 |
|  | SF50 | 8.61 |
|  | SF50 + SS | 8.85 |

C, Control untreated plants; SS, plants treated with *Hermetia illucens* larvae frass tea; SF00, plants fertilized with 100% of synthetic fertilizer; SF50, plants fertilized with 50% of synthetic fertilizer; SF50 + SS, plants fertilized with 50% of synthetic fertilizer + *Hermetia illucens* larvae frass tea.

C, Control untreated plants; SS, plants treated with *Hermetia illucens* larvae frass tea; SF00, plants fertilized with 100% of synthetic fertilizer; SF50, plants fertilized with 50% of synthetic fertilizer; SF50+SS, plants fertilized with 50% of synthetic fertilizer+*Hermetia illucens* larvae frass tea.

Growth and development. As has been observed in the data reported above *H. illucens* larvae frass tea microbial consortia achieved better plant growth and development in sorghum and tomato trials. As shown in FIGS. 4a-e, *H. illucens* larvae frass tea was found to accelerate growth and development without negative impact on crop yield.

Crop yield. *H. illucens* larvae frass tea application increased crop yield of *Sorghum* plants as compared to control (untreated) plants (Table 7). Furthermore, the crop yield after *H. illucens* with SF50 treatment was even better than SF100 treatment during standard and reduced irrigation (Table 7). Tomato plants treated with *H. illucens* larvae frass tea showed increased plant yield as compared to the control (untreated) plants (Table 7). Tomato plants treated with *H. illucens* larvae frass tea and SF50 showed the same response as with sorghum plants.

TABLE 7

Sorghum standard and reduced irrigation yield

|  |  | Yield (g · plant$^{-1}$) |
|---|---|---|
| Sorghum standard irrigation | C | 16.78 |
|  | SS | 21.01 |
|  | SF100 | 26.98 |
|  | SF50 | 21.79 |
|  | SF50 + SS | 36.95 |
| Sorghum reduced irrigation | C | 15.15 |
|  | SS | 29.00 |
|  | SF100 | 15.40 |
|  | SF50 | 13.31 |
|  | SF50 + SS | 27.87 |

C, Control untreated plants; SS, plants treated with *Hermetia illucens* larvae frass tea; SF100, plants fertilized with 100% of synthetic fertilizer; SF50, plants fertilized with 50% of synthetic fertilizer; SF50 + SS, plants fertilized with 50% of synthetic fertilizer + *Hermetia illucens* larvae frass tea.

TABLE 8

Tomato standard and reduced irrigation yield

|  |  | Yield (g · treatment$^{-1}$) |
|---|---|---|
| Tomato standard irrigation | C | 2001 |
|  | SS | 2743 |
|  | SF100 | 2994 |
|  | SF50 | 3011 |
|  | SF50 + SS | 3594 |
| Tomato reduced irrigation | C | 985 |
|  | SS | 2556 |
|  | SF100 | 1932 |
|  | SF50 | 2326 |
|  | SF50 + SS | 3217 |

C, Control untreated plants; SS, plants treated with *Hermetia illucens* larvae frass tea; SF100, plants fertilized with 100% of synthetic fertilizer; SF50, plants fertilized with 50% of synthetic fertilizer; SF50 + SS, plants fertilized with 50% of synthetic fertilizer + *Hermetia illucens* larvae frass tea.

Stress tolerance. Drought is one of the major constraints on agricultural productivity worldwide and is likely to further increase. Several adaptations and mitigation strategies are required to cope with drought stress. Plant growth promoting rhizobacteria (PGPR) could play a significant role in alleviation of drought stress in plants. These beneficial microorganisms colonize the rhizosphere/endo-rhizosphere of plants and impart drought tolerance by different mechanisms. The term Induced Systemic Tolerance (IST) was coined for physical and chemical changes in plants that result in enhanced tolerance and resistance to abiotic stress. (Vurukonda et al. (2016). Enhancement of drought stress tolerance in crops by plant growth promoting rhizobacteria. Microbial Research 184: 13-24). Consortia present in *H. illucens* larvae frass tea have been shown to turn on mechanisms of stress tolerance. Plants under a reduced irrigation program treated with it maintained yield levels similar to those observed in plants with standard irrigation (Table 7 and 8). This response was observed in both species, sorghum and tomato. *Sorghum* plants under stress treated with *H. illucens* larvae frass tea maintained yield levels above plants treated with synthetic fertilizer (Table 7). In tomato plants under stress treated with *H. illucens* larvae frass tea, the yield loss was less than 8% (in SS and SF50+SS), while in plants under stress treated with synthetic fertilizer, the losses were close to 20% (in SF100 and SF50). Losses in untreated stressed plants were even higher and close to 50% (Table 8).

These results indicate *H. illucens* larvae frass tea application improve nutrient uptake and it can be a good alternative to reduce the use of fertilizers without yield negative impact. Also, the data suggest *H. illucens* larvae frass tea could be applied as a starter this allows to improve and shorten the first stages of plant's establishment.

Example 4: Black Soldier Fly Larvae Frass Tea/Pesticide Combinations

In the examples set forth herein, results from studies with corn and soybean are described.

Example 4a: Corn

The objective of these studies was to evaluate different *Hermetia illucens* larvae frass tea application times/dates in corn and *Hermetia illucens* larvae frass tea in combination with pesticides in corn.

Materials and Methods.

*Zea mays* var. *indentata* plants were tested in plots 10 by 30 feet, 4 replicates for each treatment were tested at a dosage of 1 lb/*Hermetia illucens* tea frass/25 gallons of water. Treatments tested are detailed below.

Grower standard (control). (C) Untreated plants.

SS×SS. Plants treated twice with *H. illucens* larvae frass tea 15 gal/ac. First application was at preemergence, and second application was at the beginning of flowering.

SS. Plants treated once with *H. illucens* larvae frass tea 15 gal/ac at preemergence.

Atrazine+SS. (SS+A) Plants treated with herbicide atrazine 2 qt/ac+*H. illucens* larvae frass tea 15 gal/ac.

Quadris® (Active ingredient Azoxystrobin (Syngenta®)+ *H. illucens* larvae frass tea (SS×SS+Q) Plants treated first with *H. illucens* larvae frass tea 15 gal/ac in preemergence and secondly with the fungicide Quadris® Active ingredient Azoxystrobin (Syngenta®) 12.5 fl oz/ac+*H. illucens* larvae frass tea 15 gal/ac in pre-tassel.

Plant performance was evaluated in terms of yield.

Results

Figure 5:
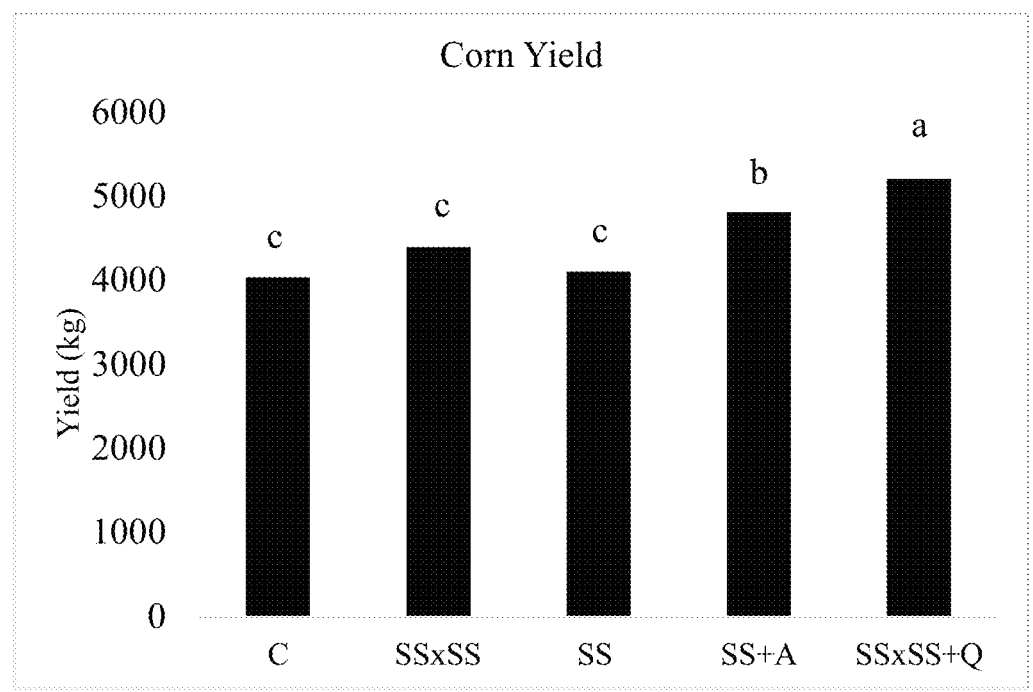
FIG. 5 show the effect of *H. illucens* larvae frass tea alone and in combination with synthetic fertilizer on corn yield. (C) Untreated plants; (SS×SS) Plants treated twice with *H. illucens* larvae frass tea 15 gal/ac. First application preemergence and second application beginning of flowering; (SS) Plants treated once with *H. illucens* larvae frass tea 15 gal/ac at preemergence; (SS+A) Plants treated with herbicide atrazine 2 qt/ac+*H. illucens* larvae frass tea 15 gal/ac; (SS×SS+Q) Plants treated first with *H. illucens* larvae frass tea 15 gal/ac in preemergence and second application with fungicide Quadris® (Active ingredient Azoxystrobin (Syngenta®) 12.5 fl oz/ac+*H. illucens* larvae frass tea 15 gal/ac in pre-tassel. Different letters indicate statistically significant differences (p<0.05).

Yield. Plants treated with one application of *H. illucens* larvae frass tea (15 gal/ac) preemergence did not show yield differences with respect to untreated plants (FIG. 5), Plants treated with one application of *H. illucens* larvae frass tea 15 gal/ac atrazine 23 days postemergence showed a statistically significant increased yield as compared to untreated plants (FIG. 5). Plants treated with two *H. illucens* larvae frass tea applications 15 gal/ac at preemergence and beginning of flowering showed a better yield as compared to untreated plants. Plants treated first with *H. illucens* larvae frass tea 15 gal/ac preemergence and secondly with fungicide Quadris® Active ingredient Azoxystrobin (Syngenta®) 12.5 fl oz/ac+ *H. illucens* larvae frass tea 15 gal/ac in pre-tassel showed the best yield results as compared to untreated plants and two applications of *H. illucens* larvae frass tea in preemergence and beginning of flowering (FIG. 5).

Example 4b. Soybean

The objective of these studies was to evaluate different *Hermetia illucens* larvae frass tea application times/dates in corn and *Hermetia illucens* larvae frass tea in combination with pesticides in corn.

Materials and Methods

*Glycine max* variety GoSoy 4912LL plants were tested in plots 10 by 30 feet, 4 replicates for each treatment were tested. 1 lb/25 gallons of water was the *Hermetia illucens* tea frass dosage. Treatments tested are detailed below.

Synthetic fertilizer (SF)—Plants were treated with synthetic fertilizer (SF) at preemergence.

(SS×SS). Plants treated twice with *H. illucens* larvae frass tea 15 gal/ac. First application was at pre-emergence and second application was at the beginning of flowering.

SS. Plants treated once with *H. illucens* larvae frass tea 15 gal/ac at preemergence.

Roundup PowerMAX® (Bayer CropScience) (active ingredient: glyphosate)+SS (SS+R). Plants treated with herbicide Roundup PowerMAX®32 fl oz/ac+*H. illucens* larvae frass tea 15 gal/ac.

Quadris® (active ingredient azoxystrobin from Syngenta®)+SS. (SS×SS+Q). Plants were treated first with *H. illucens* larvae frass tea 15 gal/ac at planting and secondly with the fungicide Quadris® (Active ingredient Azoxystrobin (Syngenta®) 12.5 fl oz/ac+*H. illucens* larvae frass tea 15 gal/ac at R1 (beginning of flowering).

Plant performance was evaluated in terms of yield.

Results.

Figure 6:
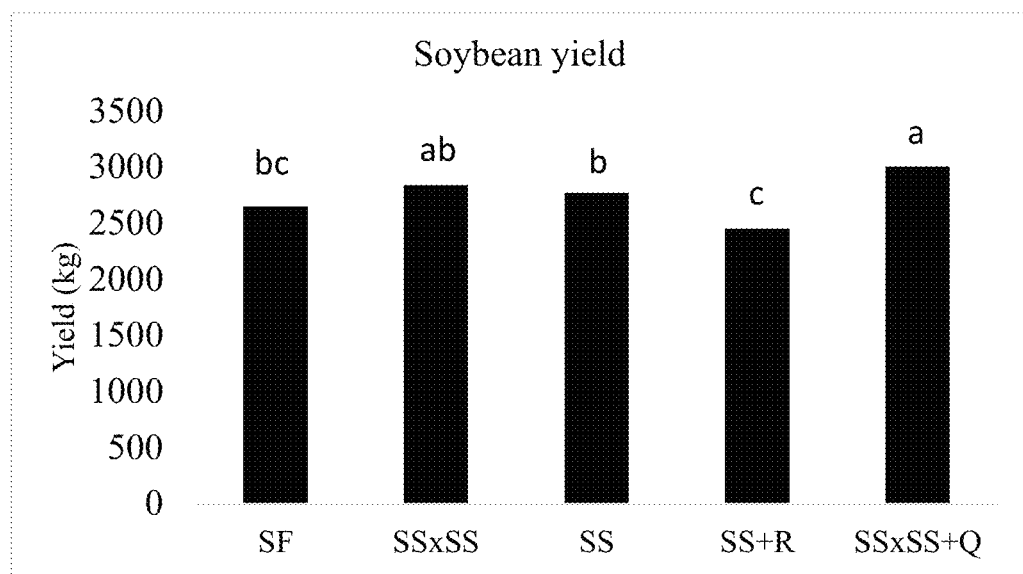
FIG. 6 show the effect of *H. illucens* larvae frass tea alone and in combination with synthetic fertilizer on soybean yield. (SF) Synthetic fertilizer; (SS×SS) Plants treated twice with *H. illucens* larvae frass tea 15 gal/ac. First application at planting and second application at R1 (beginning of flowering); (SS) Plants treated once with *H. illucens* larvae frass tea 15 gal/ac at planting; (SS+R) Plants treated with herbicide RoundUp PowerMax® (Bayer CropScience) (active ingredient: glyphosate) 32 fl oz/ac+*H. illucens* larvae frass tea 15 gal/ac; (SS×SS+Q) Plants treated first with *H. illucens* larvae frass tea 15 gal/ac at planting and second application with fungicide Quadris® (Active ingredient Azoxystrobin (Syngenta®) 12.5 fl oz/ac+*H. illucens* larvae frass tea 15 gal/ac at R1 (beginning flowering).

Yield. Plants treated once with *H. illucens* larvae frass tea during planting showed a better yield as compared to plants applied with synthetic fertilizer (SF) (FIG. 6). Furthermore, plants treated twice with *H. illucens* larvae frass tea at planting and R1 had even better yield as compared to plants treated with synthetic fertilizer (FIG. 6). *H. illucens* larvae frass tea mixed with Roundup PowerMax® showed a lower yield. This formulation contains a higher quantity of surfactants that can act as bactericides that would decrease the activity of the *H. illucens* larvae frass tea. Nevertheless, plants treated first with 15 gal/ac *H. illucens* larvae frass tea at planting and secondly with the fungicide Quadris® (Active ingredient Azoxystrobin (Syngenta®) 12.5 fl oz/ac+*H. illucens* larvae frass tea (15 gal/ac) at R1 showed the best yield (FIG. 6).

(SF) Synthetic fertilizer; (SS×SS). Plants treated twice with *H. illucens* larvae frass tea 15 gal/ac. First application at planting and second application at R1 (beginning of flowering); (SS) Plants treated once with *H. illucens* larvae frass tea 15 gal/ac at planting; (SS+R) Plants treated with herbicide Roundup PowerMAX 32 fl oz/ac+*H. illucens* larvae frass tea 15 gal/ac; (SS×SS+Q) Plants treated first with *H. illucens* larvae frass tea 15 gal/ac at planting and second application with fungicide Quadris® 12.5 fl oz/ac+*H. illucens* larvae frass tea 15 gal/ac at R1 (beginning flowering).

Example 5: Effect of *H. illucens* Larvae Frass Tea on Seed Germination

In the Example described herein, the effect of *Hermetia illucens* larvae frass tea on plant germination was evaluated.

Materials and Methods

*Hermetia illucens* larvae frass infusion (tea). 0.1 lb of *Hermetia illucens* larvae frass was mixed with 2.5 gal of water and brewed for 48 hrs. at room temperature using a constant aeration always between 6-10 ppm $O_2$. After 48 hrs. *H. illucens* larvae frass tea was applied at each site.

Experimental Set Up

Sunflower, clover, sorghum and tomato seeds were treated with *Hermetia illucens* larvae frass tea and water as a control. Seeds were placed in a wet chamber and the germination process was followed for four (4) days.

Results

*Hermetia illucens* larvae frass tea was found to induce the germination process in tomato, clover, sunflower, and sorghum and accelerate the seedling development with respect to control plants.

Example 6: Effect of *H. illucens* Larvae Frass Tea on Soil Health-Study #1

In the example described herein, the effect of *Hermetia illucens* larvae frass tea on soil health was evaluated.

Materials and Methods

Experimental set up. Trials were conducted in three different locations named as Site 1, Site 2 and Site 3. One site was designated as a control and two sites were treated with *Hermetia illucens* larvae frass infusion.

*Hermetia illucens* larvae frass infusion. 0.1 lb of *Hermetia illucens* larvae frass was mixed with 2.5 gal of water and brewing for 48 hrs. at room temperature using a constant aeration always between 6-10 ppm $O_2$. After 48 hrs., *H. illucens* larvae frass tea was applied at each site.

Soil sample collection. Soil samples were collected after the application on the test sites. Sampling was made as follows. On each site, the control site and *H. illucens* larvae frass tea treated site, 10 core samples from 10 different spots were randomly collected across each site 0-6" depth. The cores were mixed together and stored until assays could be performed.

Phospholipid and Fatty Acid Analysis (PLFA). Selected fatty acids pertaining to the soil phospholipid (PLFA) were used as biomarkers for specific soil microbial communities, were extracted using the modified Bligh and Dyer technique (Bligh et al. (1959) A rapid method of total lipid extraction and purification. *Can. J. Biochem. Physiol.* 37:911-7), described by Bardgett et al. (see Bardgett et al. (1996) Changes in soil fungal:bacterial biomass ratios following reductions in the intensity of management of an upland grassland. *Biol. Fertil. Soils* 22:261-4). In summary, air-dried and ground fresh soil was extracted with a combination of solvents. The organic fraction was extracted from the sample. The phospholipid fatty acid (PLFA) portion of the fatty acids was removed by solid phase extraction (SPE) then methylated. Samples are analyzed on a GC. A correlation between PLFA results and treatments was achieved by applying a multivariate principal component analysis (PCA).

Haney test. The Haney test method described in Haney et al. (Haney et al., (2018). The soil health tool—Theory and initial broad-scale application. *Applied Soil Ecology* 125: 162-168) measures soil nutrient cycling and metabolic rate by water extraction, acid extract and soil respiration (measured by quantifying the production of $CO_2$ by rewetting and incubating soil). The water extract measures organic carbon and nitrogen, indicating the soil's ability to cycle nutrients, particularly phosphorous and nitrogen. The acid extract measures the micro and macronutrients that become available with microbial and root activity.

Soil Health Analysis: Water Holding Capacity (WHC), Wet Aggregate Stability, Permanganate Oxidizable Carbon (POXC)

Water Holding Capacity (WHC). (WHC) measures the field capacity and wilting point of a soil to provide an estimate of the quantity of water that may be available to crops. This soil property is strongly influenced by soil texture and organic matter. The following procedure was used to determine water holding capacity (WHC) of a sample, its ability of soil to hold water between field capacity (amount of water a soil can hold without becoming saturated) and wilting point (amount of water a soil can hold that is no longer accessible to plants). Soil samples (approximately 25 grams each) were processed at 0.1 Bars and 15 bar pressures, which mimic field capacity and wilting point respectively. One (1) bar and fifteen (15) bar ceramic plates were previously saturated prior to placing air-dried, 2-mm sieved samples to fill sample retaining rings. Samples were placed in their respective pressure vessels, then saturated with deionized water. Once saturated, pressure vessels were sealed and slowly brought up to pressure. As a result, excess water at pressure drained from the vessels. Once equilibrium was reached, as indicated by a lack of water extraction, pressure within the vessels is slowly released and samples were removed. Samples were weighed upon removal from vessels (field capacity) then again after samples have been dried in an oven overnight (water holding capacity). The difference between the weights at field capacity and wilting point are calculated to determine water holding capacity.

Wet Aggregate Stability (% soil aggregate in a soil). Wet aggregate stability is a necessary physical soil property that can indicate a soil's ability to resist disturbances from physical and chemical forces, store water, allow the movement of air and water, and influence the growth and form of roots. This method tests the stability of: macroaggregates and microaggregates and provides an overall aggregation percentage by determining the total soil aggregate, macroaggregates (>0.25 mm), microaggregates 0.25 mm and >0.053 mm). Specifically, two different sieve sizes to collect macroaggregates (>0.25 mm) and microaggregates (<0.25 mm and >0.053 mm) fractions of the soil.

Permanganate oxidizable Carbon (POXC). Permanganate oxidizable carbon (POXC) is a measure of the biologically active carbon fraction of the soil. This portion of carbon often contains easily consumed energy sources, such as plant sugars, polysaccharides, and glomalin, that fuels microbial activity. POXC quickly responds to soil management changes and can provide an early indication of practices that promote stabilization of organic matter and has been shown to indicate changes earlier than other carbon measuring methods as described in Culman et al. (Culman et al. (2012) Permanganate oxidizable carbon reflects a processed soil fraction that is sensitive to management. *Soil Biology and Biochemistry.* 76(2): 494-504).

Results

Phospholipid and Fatty Acid Analysis (PLFA). Results from PCA of PLFA indicate that soils treated with *H. illucens* larvae frass tea were positively correlated with total fungi particularly arbuscular mycorrhizal and saprophytic, total bacteria both Gram+ and Gram−, functional group diversity, total biomass parameters, as well as the Fungi: bacteria and Protozoa:bacteria ratios, whereas the opposite was observed in untreated soils. Furthermore, the stress indicator parameters were generally positively correlated in *H. illucens* larvae frass treated soil as compared to untreated soil.

Haney test. The analysis of Haney Test results clearly revealed that soils treated with *H. illucens* larvae frass tea were positively correlated with nutrient value, soil health index, organic matter, respiration rate ($CO_2$—C), microbially active carbon (% MAC), most micronutrients, availability of nitrogen (N), phosphorus (P) and potassium (K), whereas the opposite was observed in untreated soils.

Soil Health Analysis: Wet Aggregate Stability, Water Holding Capacity (WHC), Permanganate Oxidizable Carbon (POXC).

Three geographical sites were tested. Three *H. illucens* larvae frass tea treated sites and one untreated site (control) were analyzed at Site 1 and two *H. illucens* larvae frass tea treated sites and one untreated site (control) were analyzed at Sites 2 and 3. The results in soils are summarized (see Table 9). The biologically active carbon fraction measured by POXC determination was enhanced by *H. illucens* larvae frass tea application with respect to control untreated soils (Table 9). The soil water holding capacity (WHC) was found to increase after *H. illucens* larvae frass tea application in all tested sites with respect to control untreated soils (Table 9). The soil macroaggregates and total aggregates increased after *H. illucens* larvae frass tea application in Site 1 (Table 9). The same response was observed at Site 3 where there was also an increase in microaggregates after treatment with *H. illucens* larvae frass tea with respect to untreated soil (Table 9). Soil aggregation is strongly influenced by soil texture, organic matter, cementing agents, and soil management practices. Improving soil aggregation can improve bulk density, aeration, permeability, and water holding capacity of the soil.

TABLE 9

Permanganate oxidizable Carbon (POXC), Water Holding Capacity (WHC) and Wet aggregate stability: microaggregates, macroaggregates and % total aggregates in sites 1, 2, and 3

| Site | Sample ID | POXC, ppm C | WHC, g H$_2$O g soil$^{-1}$ | WHC, in H$_2$O in soil$^{-1}$ | WHC, in H$_2$O sample depth soil$^{-1}$ | Macro-aggregates, % >0.25 mm | Micro-aggregates, % <0.25, >0.053 mm | Total Aggregates, % |
|---|---|---|---|---|---|---|---|---|
| Site 1 | Control | 142 | 0.03 | 0.04 | 0.24 | 16.7 | 1.2 | 17.9 |
|  | Treated 1 | 215 | 0.05 | 0.07 | 0.4 | 22.1 | 0.5 | 22.7 |
|  | Treated 2 | 144 | 0.04 | 0.05 | 0.32 | 23.9 | 0.5 | 24.5 |
|  | Treated 3 | 286 | 0.03 | 0.04 | 0.24 | 16.5 | 0.9 | 17.4 |
| Site 2 | Control | — | 0.26 | 0.34 | 2.05 | 67.1 | 18.9 | 86.1 |
|  | Treated 1 | — | 0.28 | 0.37 | 2.23 | 54.8 | 17.3 | 72.1 |
|  | Treated 2 | — | 0.29 | 0.38 | 2.3 | 50.7 | 22.4 | 73.1 |
| Site 3 | Control | 284 | 0.14 | 0.18 | 1.11 | 19.7 | 10.2 | 29.9 |
|  | Treated 1 | 432 | 0.15 | 0.2 | 1.19 | 26.5 | 10 | 36.5 |
|  | Treated 2 | 355 | 0.1 | 0.13 | 0.79 | 33 | 10.5 | 43.5 |

Control, untreated soil; Treated, soil treated with *H. illucens* larvae frass.

(—) indicates parameter was not tested.

Example 7: Effect of Black Soldier Fly Frass on Soil Microbiome

In the example described herein, Biome Makers were used to assess soil microbiome with and without frass during a seven-month period. Soil samples of BSF frass and control (composted chicken manure) treated *cannabis* plants were taken at three time points: pre-plant (T0), vegetative stage (T1), and flowering stage (T2). Samples were analyzed for changes in microbial community over time with respect to biodiversity, nutrient pathways, plant hormone production, stress tolerance, biocontrol, and disease prevalence.

Sample Processing. For the microbial amplicon-based survey, a total of 200 mg of soil per sample was used for the DNA extraction based on a bead-beating method, DNeasy Powerlyzer Powersoil Kit using QIAcube Connect (Qiagen, Hilden, Germany), according to the manufacturer's instructions. The DNA samples were stored at −20° C. until use.

Library Preparation and High-Throughput Sequencing. PCR assays were prepared using sterilized material and equipment, while negative controls containing nuclease-free water were run alongside the samples. Samples were analyzed for the 16S rRNA gene V4 region and the ITS gene by amplification of the ITS1 region using WineSeq® custom primers as set forth in US20180363031A1. After a quality control check by gel electrophoresis, the 16S rRNA and ITS libraries were pooled in equimolar concentration and subsequently sequenced on an Illumina MiSeq instrument using a 2×300 bp MiSeq Reagent Kit v3 kit (Illumina, San Diego, CA, USA), as also set forth in US20180363031A1.

Bioinformatics processing. The bioinformatic processing starts with the search and removal of the primers from the paired sequencing reads using Cutadapt (Martin (2011) Cutadapt removes adapter sequences from high-throughput sequencing reads. *EMBnet J.* 17(1):10-12. DOI: http://dx-.doi.org/10.14806/ej.17.1.200.), followed by the elimination of any read pairs where the forward or reverse may now have less than 100 nucleotides. The trimmed reads were then merged with a minimum overlap of 100 nucleotides, while in the cases where the reads merge failed (typically in cases of very long amplicons or poor quality reverse reads) the forward read is recovered if it passes a secondary filter where it's truncated at Q20 quality and pass if the remaining size have at least 100 nucleotides. Next, the sequences were quality filtered by Expected Error (Edgar and Flyvbjerg (2015) Error filtering, pair assembly and error correction for next-generation sequencing reads. *Bioinformatics* 31(21): 3476-3482) with a maximum value of 1.0. Additionally, due to their highly conserved length, the 16S reads were subjected to an additional length filter where they are removed if their size falls outside of a 203-303 nucleotides boundary. After all the initial quality filtering, reads that have a single nucleotide difference are iteratively clustered together to form ASVs (Amplicon Sequencing Variants) using Swarm (Mahé et al. (2021) Swarm v3: towards tera-scale amplicon clustering. *Bioinformatics* DOI:https://doi.org/10.1093/bioinformatics/btab493), followed by de novo chimera removal (Edgar et al. (2011) UCHIME improves sensitivity and speed of chimera detection. *Bioinformatics* 27 (16): 2194-2200. doi:10.1093/bioinformatics/btr381), and removal of remaining singletons. Finally, the ASVs were compared against a reference database of amplicons built using the latest version available of SILVA 138.1 (Glöckner et al. (2017) 25 years of serving the community with ribosomal RNA gene reference databases and tools. *J Biotechnol.* 261:169-176) for 16S sequences and UNITE 8.3 (Nilsson et al. (2019) The UNITE database for molecular identification of fungi: handling dark taxa and parallel taxonomic classifications. *Nucleic Acids Res.* 47:D259-D264) for ITS sequences, where the original reference sequences are used to bioinformatically predict the amplicons generated by primers used. Taxonomy conflicts (identical reference amplicons from different species) were resolved to either the most probable species if possible, or the nearest common ancestor (up to family level).

Results

The BSFL frass treatment was found to have the following significant effects set forth in Table 10.

TABLE 10

| Effect of BSFL Treatment on Soil Microbiome | |
|---|---|
| Biodiversity | BSF treatment accounted for 11% of bacterial variability compared to control |
| Nutrient pathways | Increased carbon fixation<br>Increased inorganic nitrogen release<br>Increased microbial nitrogen immobilization |
| Plant hormone production | Increased microorganisms responsible for cytokinin production (Main species: *Arthrobacter* sp., *Trichoderma atroviride*, *Trichoderma virens*) |
| Stress tolerance | Increased microorganisms responsible for salt tolerance (mainly *Pseudomonas* sp.)<br>Decreased microorganisms responsible for heavy metal solubilization (Mainly *Achromobacter xylosoxidans* and some species of *Bradyrhizobium* sp. and *Burkholderia* sp.)<br>Decreased microorganisms responsible for salicylic acid production (mainly *Achromobacter* sp.) |
| Biocontrol | Increased biocontrol agents with nematicide properties (most notably *Paecilomyces lilacinus*, aka *Purpureocillium lilacinum*)<br>Notable but below significant increase in biocontrol agents with fungicide properties |
| Disease prevalence | Decreased abundance of *Epicoccum nigrum*, the fungus responsible for black dot disease |

The results of this study indicate that BSF larvae frass application has the following effects on the soil microbiome: (1) Bacterial biodiversity changed significantly from control to treatment in T1 and T2. Fungal biodiversity did not change significantly. (2) Sampling time significantly modified the bacterial and fungal composition of the microbiome, as was expected, explaining 49% and 43% of the variability, respectively. (3) Treatment significantly modified the bacterial composition of the microbiome, explaining 11% of the variability.

Example 8: Antifungal Properties of *Hermetia illucens* Larvae Frass Infusion

*Hermetia illucens* larvae frass infusion and bacteria isolated from *Hermetia illucens* larvae frass (SS) were co-cultivated with the widespread fungal phytopathogens *Fusarium graminearum, Fusarium oxysporum, Fusarium avenaceum, Fusarium cerealis, Fusarium sambusium, Rhizoctonia solani, Colletotrichum coccodes, Botrytis cinerea alfalfa, Botrytis cinerea* 191 and *Botrytis cinerea fabea* to assess their ability to inhibit fungal growth.

Materials and Methods

Organisms used. A detailed list of organisms is shown in Table 11.

TABLE 11

| Organisms Used | |
|---|---|
| Bacteria isolated from *Hermetia illucens* larvae frass to date | Pathogenic fungi |
| 1. *Bacillus velezensis* | *Botrytis cinerea fabea* |
| 2. *Bacillus haynesii* | *Botrytis cinerea alfalfa* |
| 3. *Bacillus velezensis* | *Botrytis cinerea* 191 |
| 4. *Bacillus velezensis* | *Colletotrichum coccodes* |
| S4. *Bacillus licheniformis* | *Rhizoctonia solani* |
| 6. *Bacillus amiloliquefaciens* | *Fusarium sambusium* |
| 7. *Bacillus altitudinis* | *Fusarium avenaeceum* |
| 8. *Bacillus velezensis* | *Fusarium cerealis* |
| S13. *Bacillus velezensis* | *Fusarium oxysporum* |
| F. *Hermetia illucens* larvae frass infusion | *Fusarium graminearum* |

*Hermetia illucens* larvae frass infusion and 9 selected *Bacillus* spp. isolated from *Hermetia illucens* larvae frass were used. Specifically, Basidiomycete *Rhizoctonia solani*, the ascomycetes *Fusarium* spp., *Colletotrichum coccodes*, and *Botrytis cinerea* were used as part of fungi test. These four species are representative of widespread soil-borne phytopathogens causing root rot in numerous crops and responsible for serious yield losses world-wide (Goswami et al. (2004) Heading for disaster: *Fusarium graminearum* on cereal crops. *Molecular Plant Pathology* 5 (6): 515-525). Fungi were kept on potato agar dextrose plates (PDA, Millipore Co.); one week old cultures were used as stock to seed new co-cultured plates.

*Hermetia illucens* larvae frass infusion. 0.1 lb of *Hermetia illucens* larvae frass was mixed with 2.5 gal of water and brewing for 48 hrs. at room temperature using a constant aeration always between 6-10 ppm $O_2$.

Experimental conditions. The experiments were carried out on PDA, which is a standard medium used for cultivating phytopathogenic fungi and on which *Bacillus* spp. grow well. *Hermetia illucens* larvae frass bacteria were extracted freshly for the challenge. Isolated bacteria from *Hermetia illucens* larvae frass (*Bacillus* spp.) from frozen stocks were pre-grown overnight in liquid Lysogeny Broth (LB) medium.

Antifungal activity. Fungal inoculated discs were plated in the center of each plate. In the event that fungal growth is slow, they were plated 2 or 3 days before the challenge (depend on which specie). 10 uL drops of each of the above-described community were pipetted on a top of discs in PDA plates (2 drops each disc per plate). 10 uL drops of tea were pipetted on a top of discs in the PDA plates. Plates were incubated at room temperature and 28° C. between 4-10 days. If there was no distance between mycelium and the border of the bacterial colony this indicates there is no inhibition effect. If there was an inhibition halo forming a circle between the bacteria and developing fungi this indicates bacteria is inhibiting the fungi growth.

Results

Bacteria used in this study were isolated from *Hermetia illucens* larvae frass. Nine bacterial isolates were pre-screened using an agar-diffusion assay. Isolates were identified to at least the genus and specie level by 16s rRNA and gyrB gene sequencing. Also, the entirely *Hermetia illucens* larvae frass complex bacteria (F) were challenged in each plate as a control.

As shown in Table 12, all genotypes display antifungal activity. They further share the common feature of inducing the fungal growth inhibition in all cases. *Hermetia illucens* larvae frass complex bacteria (F) and each *Hermetia illucens* larvae frass forming bacteria isolated to date have antifungal effect. Depending on which fungi we evaluated the plates were incubated between 4-10 days until no changes on growth was observed.

TABLE 12

Antifungal effect after challenge

| Pathogenic Fungi | 1 | 2 | 3 | 4 | S4 | 6 | 7 | 8 | 13 | F |
|---|---|---|---|---|---|---|---|---|---|---|
| B. cinerea fabe | — | — | — | — | X | — | — | — | X | X |
| B. cinerea alfalf | X | X | X | X | X | X | X | X | X | X |
| B. cinerea 191 | X | X | X | X | X | X | X | X | X | X |
| C. coccodes | X | X | X | X | X | X | X | X | X | X |
| R. solani | X | X | X | X | X | X | X | X | X | X |
| F. cerealis | X | X | X | X | X | X | X | X | X | X |
| F. avenaeseum | X | X | X | X | X | X | X | X | X | X |
| F. graminearum | X | X | X | x | X | X | X | X | X | X |
| F. oxysporum | X | X | X | x | X | X | X | X | X | X |
| F. sambusium | — | — | — | — | X | — | — | — | X | X |

(X) indicates antifungal effect;
(x) indicates weak antifungal effect.
(—) indicates challenge no tested Example 9: Determination of Functional Groups on Frass The different functional groups of bacteria present in a *Hermetia illucens* frass formulation sample are determined by plating onto various cultural media. Examples of such methods are set forth below.

Detection of Endospores

The value of biological products (compost teas, compost, biofertilizers and pure inoculums) is in the ability of the bacteria in these products to survive harsh environmental conditions (i.e., drought, high temperatures, UV radiation etc.). The group of bacteria that can protect themselves in these conditions are called endospore-forming bacteria. Laboratory conditions to detect endospore-forming bacteria involves heating all 8 dilution tubes of a sample in water bath at 75° C. for 10 minutes. After 10 minutes a 100 ul aliquot from each dilution (i.e., 10-1 through 10-8) of sample is plated onto Tryptic Soy Agar and plates are incubated at 30° C. for 12 hours.

Detection of Cellulose Degraders

Crop residue is high in nutrients. Corn residue from a 200-bushel crop contains approximately 116 units of Nitrogen (N), 27 units of phosphorus (P) and 209 units of potassium (K). Thus, bacteria that can efficiently breakdown crop residue to help with the start of decomposition can then be valuable in helping to reduce fertilizer costs and improve nutrient acquisition. Cellulose degrading medium (composition of media per liter: tap water, 900 ml; soil extract, 100 ml; MgSO4-H2O; Cellulose, 2.26 grams; congo red, 0.26 grams; gelatin, 2.06 grams; noble agar, 6 grams and autoclaved at 121° C. for 15 minutes) will grow cellulose degrading bacteria which is indicated by a "zone of clearing" around the colony. A 100 ul aliquot from each dilution (i.e., 10-1 through 10-8) of sample is plated onto Cellulose medium and incubated at 30 for 5 days.

Detection of Halophilic Bacteria

Halophilic bacteria are detected by salt (NaCl) and substrate (starch/olive oil/gelatin) enrichment (see, for example, Kumar et al. (2012) "Screening and Isolation of Halophilic Bacteria Producing Industrially Important Enzymes", Brazilian Journal of Microbiology (2012): 1595-1603). Samples can be further characterized for enzymatic activity such as hydrolase, lipase and amylase.

Detection of Phosphorous Solubilizers

Phosphorus in many alkaline and high calcareous soils is insoluble. This results in high use of phosphorus fertilizers which only gets immobilized due to high levels of calcium. In these soils calcium binds to phosphorus limiting its availability. Bacteria capable of breaking the bond between calcium and phosphorus are detected in PSB media (composition per liter: dextrose, 10 grams; NaCl, 5 grams; KCl, 0.2 grams; MgSO4, 0.1 grams; MnSO$_4$, 0.2 grams; FeSO$_4$, 0.002 grams; (NH$_4$)$_2$SO$_4$, 0.5 grams; yeast extract, 0.5 grams; (Ca$_3$)$_2$(PO$_4$)$_2$, 5 grams; noble agar 15 grams and autoclaved for 15 minutes at 121° C.) by a "zone of clearing" around the colony growth. A 100 ul aliquot from each dilution (i.e., 10-1 through 10-8) of sample is plated onto PSB media plates and incubated at 30° C. for 4 days.

Detection of Nitrifying Bacteria

Such bacteria can efficiently break down crop residue to help with the start of decomposition and can be valuable in helping to reduce fertilizer costs and improve nutrient acquisition. Specifically, NFB agar provides the carbohydrate source that helps promote the growth of free-living nitrogen fixing bacteria. NFB agar is medium rich in dextrose and molybdenum to help promote the growth of free-living nitrogen fixing bacteria (composition of media per liter: dextrose, 5 grams; MgSO$_4$-7H$_2$O, 0.2 grams; N$_2$2MoO$_4$-2H$_2$O, 0.01 grams, CaCl$_2$, 0.15 grams; K$_2$HPO$_4$, 0.8 grams; noble agar, 15 grams; autoclaved for 15 minutes at 121° C.). A 100 ul aliquot from each dilution (i.e., 10-1 through 10-8) of sample is plated onto NFB media plates and incubated at 30° C. for 4 days.

Detection of Heterotrophic Bacteria

Heterotrophic bacteria grow on tryptic soy agar. Tryptic Soy Agar is nutrient rich agar high in casein, soybean and dextrose allows the growth of a wide variety of bacteria that utilize these carbon sources (composition of media per liter: tryptic soy broth, 30 grams; solidifying agar, 15 grams which is then sterilized in autoclave for 15 minutes at 121° C.). A 100 ul aliquot from each dilution (i.e., 10-1 through 10-8) of sample is plated onto TSA media plates and incubated at 30° C. for 12 hours.

Detection of Fluorescent Pseudomonads

King's B medium (proteose peptone, 10 grams; K$_2$HPO$_4$1.5 grams; glycerol 5 ml which is heated while agitating to dissolve; then 1M MgSO$_4$, 5 ml is added, and pH is adjusted to 7.2 and autoclaved for 15 minutes at 121° C.) is used to grow *Pseudomonas*. Fluorescent pseudomonads produce a yellow pigment that fluoresces under longwave ultraviolet light (366 nm). A 100 ul aliquot from each dilution (i.e., 10-1 through 10-8) of sample is plated onto King's B medium and incubated at 30° C. for 12 hours.

Example 10: Effect of Black Soldier Fly Larvae Frass Tea Fertilizer Combinations on Plant Performance in Corn The Example set forth herein describes results from studies with corn. Different *Hermetia illucens* larvae frass tea application rates, in combination with synthetic fertilizer (SF) applications, were evaluated for various plant performance outcomes.

Materials and Methods

*Zea mays* plants were tested in 10×40 ft. plots with four replicates. The treatments were as follows: Untreated check (control), 2 app. *Hermetia illucens* larvae frass tea (SS) applied in-furrow (performed during planting, in the seed furrow allowing the seedling easy access to the product) and at (a) V4 (occurs when the fourth leaf collar is visible) or (b) pre-tassel (occurs during the period of time before the lowest branch of the tassel is visible, specifically between V14 (when the 14$^{th}$ leaf collar is visible and VT, when the last branch of the tassel is completely visible); synthetic fertilizer (SF) meaning 32% UAN (urea/ammonium nitrate) pre-emergence (PRE) and post-emergence (POST) at 100% SF (29 gal/acre PRE and POST) and 75% SF (14 gal/acre PRE and 20 gal/acre POST). Specific treatment protocols are set forth in Table 13 infra.

TABLE 13

Treatment Protocols

| Treatment | | Rate (gal/acre) | Application time |
|---|---|---|---|
| 1 | Check | | |
| 2 | SS | 10 | In-furrow (A) |
| | SS | 20 | V4 (B) |
| | SF | 29 | PRE (C) |
| | SF | 29 | POST (D) |
| 3 | SS | 10 | In-furrow (A) |
| | SS | 20 | Pre-tassel (E) |
| | SF | 29 | PRE (C) |
| | SF | 29 | POST (D) |
| 4 | SS | 10 | In-furrow (A) |
| | SS | 40 | V4 (B) |
| | SF | 29 | PRE (C) |
| | SF | 29 | POST (D) |
| 5 | SS | 10 | In-furrow (A) |
| | SS | 40 | Pre-tassel (E) |
| | SF | 29 | PRE (C) |
| | SF | 29 | POST (D) |
| 6 | SS | 20 | In-furrow (A) |
| | SS | 20 | V4 (B) |
| | SF | 29 | PRE (C) |
| | SF | 29 | POST (D) |
| 7 | SS | 20 | In-furrow (A) |
| | SS | 20 | Pre-tassel (E) |
| | SF | 29 | PRE (C) |
| | SF | 29 | POST (D) |
| 8 | SS | 20 | In-furrow (A) |
| | SS | 40 | V4 (B) |
| | SF | 29 | PRE (C) |
| | SF | 29 | POST (D) |
| 9 | SS | 20 | In-furrow (A) |
| | SS | 40 | Pre-tassel (E) |
| | SF | 29 | PRE (C) |
| | SF | 29 | POST (D) |
| 10 | SF | 29 | PRE (C) |
| | SF | 29 | POST (D) |
| 12 | SF | 14 | PRE (C) |
| | SF | 29 | POST (D) |
| 13 | SS | 10 | In-furrow (A) |
| | SS | 20 | V4 (B) |
| | SI | 14 | PRE (C) |
| | SF | 29 | POST (D) |
| 14 | SS | 10 | In-furrow (A) |
| | SS | 20 | Pre-tassel (E) |
| | SF | 14 | PRE (C) |
| | SF | 29 | POST (D) |
| 15 | SS | 10 | In-furrow (A) |
| | SS | 40 | V4 (B) |
| | SF | 14 | PRE (C) |
| | SF | 29 | POST (D) |
| 16 | SS | 10 | In-furrow (A) |
| | SS | 40 | Pre-tassel (E) |
| | SF | 14 | PRE (C) |
| | SF | 29 | POST (D) |
| 17 | SS | 20 | In-furrow (A) |
| | SS | 20 | V4 (B) |
| | SF | 14 | PRE (C) |
| | SF | 29 | POST (D) |
| 18 | SS | 20 | In-furrow (A) |
| | SS | 20 | Pre-tassel (E) |
| | SF | 14 | PRE (C) |
| | SF | 29 | POST (D) |
| 19 | SS | 20 | In-furrow (A) |
| | SS | 40 | V4 (B) |
| | SF | 14 | PRE (C) |
| | SF | 29 | POST (D) |
| 20 | SS | 20 | In-furrow (A) |
| | SS | 40 | Pre-tassel (E) |
| | SI | 14 | PRE (C) |
| | SF | 29 | POST (D) |
| 21 | SS | 10 | In-furrow (A) |
| | SS | 20 | V4 (B) |
| | SF | 0 | PRE (C) |
| | SF | 29 | POST (D) |
| 22 | SS | 10 | In-furrow (A) |
| | SS | 20 | Pre-tassel (E) |
| | SF | 0 | PRE (C) |
| | SF | 29 | POST (D) |
| 23 | SS | 10 | In-furrow (A) |
| | SS | 40 | V4 (B) |
| | SF | 0 | PRE (C) |
| | SF | 29 | POST (D) |
| 24 | SS | 10 | In-furrow (A) |
| | SS | 40 | Pre-tassel (E) |
| | SF | 0 | PRE (C) |
| | SF | 29 | POST (D) |
| 25 | SS | 20 | In-furrow (A) |
| | SS | 20 | V4 (B) |
| | SF | 0 | PRE (C) |
| | SF | 29 | POST (D) |
| 26 | SS | 20 | In-furrow (A) |
| | SS | 20 | Pre-tassel (E) |
| | SF | 0 | PRE (C) |
| | SF | 29 | POST (D) |
| 27 | SS | 20 | In-furrow (A) |
| | SS | 40 | V4 (B) |
| | SF | 0 | PRE (C) |
| | SF | 29 | POST (D) |
| 28 | SS | 20 | In-furrow (A) |
| | SS | 40 | Pre-tassel (E) |
| | SF | 0 | PRE (C) |
| | SF | 29 | POST (D) |

SS: plants treated with *Hermetia illucens* larvae frass tea; SF: plants fertilized with 32% UAN Treatments 2 to 10 received 100% fertilizer rate (SF100); Treatment 12 to 20 got 75% fertilizer rate (SF75) and treatment 12

Results and Analysis

Plant performance was measured in terms of yield and grain nutritional value (% crude protein present in dry matter of plant grain). Furthermore, to measure the % protein increase with respect to untreated plants, treated plants were compared with their respect untreated controls (SF100 and SF75) plant. The results are set forth in Table 14 infra.

TABLE 14

Effect of SS/SF Combinations on Plant Yield and Protein Content

| # | Treatment | Rate (gal/acre) | Appln time | Yield (bu/acre) | Crude protein (%) | Protein increase (% respect to untreated) |
|---|---|---|---|---|---|---|
| 1 | Check | | | 127.3 | 9.43 | |
| 2 | SS<br>SS<br>SF100 | 10<br>20 | A<br>B | 123.0 | 9.41 | 2.1 |
| 3 | SS<br>SS<br>SF100 | 10<br>20 | A<br>E | 127.2 | 9.76 | 5.9 |
| 4 | SS<br>SS<br>SF100 | 10<br>40 | A<br>B | 120.7 | 9.67 | 5.1 |
| 5 | SS<br>SS<br>SF100 | 10<br>40 | A<br>E | 136.6 | 9.64 | 4.6 |
| 6 | SS<br>SS<br>SF100 | 20<br>20 | A<br>B | 136.9 | 9.77 | 6.0 |
| 7 | SS<br>SS<br>SF100 | 20<br>20 | A<br>E | 129.9 | 9.80 | 6.3 |
| 8 | SS<br>SS<br>SF100 | 20<br>40 | A<br>B | 128.7 | 9.34 | 9.0 |
| 9 | SS<br>SS<br>SF100 | 20<br>40 | A<br>E | 125.8 | 10.05 | 6.3 |
| 10 | SF100 | | | 116.6 | 9.22 | |
| 12 | SF75 | | | 133.1 | 9.02 | |
| 13 | SS<br>SS<br>SF75 | 10<br>20 | A<br>B | 131.3 | 9.59 | 6.3 |
| 14 | SS<br>SS<br>SF75 | 10<br>20 | A<br>E | 125.2 | 9.34 | 3.5 |
| 15 | SS<br>SS<br>SF75 | <br>10 | A<br>B | 134.0 | 9.26 | 2.5 |
| 16 | SS<br>SS<br>SF75 | 10<br>40 | A<br>E | 142.4 | 9.15 | 1.3 |
| 17 | SS<br>SS<br>SF75 | 20<br>20 | A<br>B | 134.0 | 9.81 | 8.6 |
| 18 | SS<br>SS<br>SF75 | 20<br>20 | A<br> | 139.5 | 9.43 | 4.4 |
| 19 | SS<br>SS<br>SF75 | 20<br>40 | A<br>B | 134.8 | 9.87 | 9.3 |
| 20 | SS<br>SS<br>SF75 | 20<br>40 | A<br>E | 137.0 | 9.56 | 5.9 |

The results demonstrate increased corn yield in all the cases when combined with SF100. Yield increases were higher when the second application was performed at corn pre-tassel as compared to application at V4. More specifically application in furrow at 20 gal/acre and V4 or pre-tassel enhanced the yield consistently (17.4% increase in furrow 20 gal/acre and 20 gal/acre at V4 and 11.4% increase in furrow 20 gal/acre and 20 gal/acre at pre-tassel). Furthermore, when the fertilizer rate was reduced 25%, (SF75) SS application increased yield mainly when the second application was applied at pre-tassel. SS applied in-furrow and pre-tassel increased the yield between 3-7% with respect to untreated plants.

Two applications of SS increased the protein content between 1 to 9% with respect to untreated plants (Table 14) when combined with SF100 and SF75. The higher values were detected when in-furrow application rate was at 20 gal/acre and combined with SF100 (6-9% increase with respect to untreated plants). Moreover, the same response was observed when SS at 20 gal/acre in-furrow were applied with SF75% (4-9% increased with respect to untreated plants).

Conclusion

Altogether, these results demonstrate that two applications of SS, increased corn yield between 6%-17% and corn protein content between 1%-9%. When the fertilizer rate was reduced 25%, SS application increased yield when applied at pre-tassel, as well as the protein content between 1%-6%.

Example 11: Effect of Black Soldier Fly Larvae Frass Tea on Soybean Plant Yield and Protein Content The Example set forth herein describes results from studies with soybean. Different *Hermetia illucens* larvae frass tea application rates, were evaluated for its effect on plant yield and protein content.

Materials and Methods

Soybean plants were tested in 10×40 ft. plots with four replicates. The treatments were as follows: Untreated check (control), 2 app. *Hermetia illucens* larvae frass tea (SS) in-furrow (performed during planting, in the seed furrow allowing the seedling easy access to the product) and either at (a) V4 (which occurs 2-3 weeks after emergence for full-season soybean and when four trifoliate leaves are fully developed) or (b) R3 (which occurs when one pod on one of the four upper nodes reaches three-sixteenth inch long) Specific treatment protocols are set forth in Table 15 below.

TABLE 15

Soybean Treatment Protocols

| | Treatment | Rate (gal/acre) | Application time |
|---|---|---|---|
| 1 | Check | | |
| 2 | SS<br>SS | 10<br>20 | In-furrow (A)<br>R3 (C) |
| 3 | SS<br>SS | 10<br>20 | In-furrow (A)<br>V4 (B) |
| 4 | SS<br>SS | 10<br>40 | In-furrow (A)<br>R3 (C) |
| 5 | SS<br>SS | 10<br>40 | In-furrow (A)<br>V4 (B) |
| 6 | SS<br>SS | 20<br>20 | In-furrow (A)<br>R3 (C) |
| 7 | SS<br>SS | 20<br>20 | In-furrow (A)<br>V4 (B) |
| 8 | SS<br>SS | 20<br>40 | In-furrow (A)<br>R3 (C) |
| 9 | SS<br>SS | 20<br>40 | In-furrow (A)<br>V4 (B) |

Results

The results are set forth in Table 16 below.

TABLE 16

Effect of SS Treatment on Soybean Yield and Protein Content

| Trtmnt | | Rate (gal/ac) | Appln time | Yield (bushel/ac) | Yield % respect to control | Protein content (% crude protein/dry matter) | Protein % respect to control |
|---|---|---|---|---|---|---|---|
| 1 | Check | | | 34.4 | | 39.28 | |
| 2 | SS | 10 | A | 37.1 | 7.8 | 39.65 | 0.92 |
|   | SS | 20 | C | | | | |
| 3 | SS | 10 | A | 40.6 | 18.2 | 39.82 | 1.37 |
|   | SS | 20 | B | | | | |
| 4 | SS | 10 | A | 34.0 | −1.1 | 40.62 | 3.41 |
|   | SS | 40 | C | | | | |
| 5 | SS | 10 | A | 37.6 | 9.2 | 40.39 | 2.83 |
|   | SS | 40 | B | | | | |
| 6 | SS | 20 | A | 36.1 | 4.8 | 39.73 | 1.14 |
|   | SS | 20 | C | | | | |
| 7 | SS | 20 | A | 39.3 | 14.3 | 40.25 | 2.47 |
|   | SS | 20 | B | | | | |
| 8 | SS | 20 | A | 36.5 | 6.1 | 40.69 | 3.57 |
|   | SS | 40 | C | | | | |
| 9 | SS | 20 | A | 39.3 | 14.2 | 40.27 | 2.52 |
|   | SS | 40 | B | | | | |

An increased yield after two applications of SS, with the first application in-furrow and the second application at V4 (before flowering) in all cases. SS was applied at 10 gal/acre in-furrow and 20 gal/acre at V4 (3), which showed an 18.7% increase on soybean yield with respect to control (1), following by treatment #7 and #9 that showed a 14.9% and 14.9% increase in soybean yield, respectively (SS applied 20 gal/acre in-furrow and 20 or 40 gal/acre at V4, respectively). SS applied 10 gal/acre in-furrow and 40 gal/acre at V4 (5) showed a 9.9% increase on the soybean yield with respect to control (1).

An increased yield was observed after two applications of SS, with the first application in-furrow and the second application at R3 in treatments 2, 6, and 8. When SS was applied at 10 gal/acre in-furrow and 20 gal/acre at R3 (2), a 7.8% increase in soybean yield was observed with respect to control (1). Treatments #8 and #6 resulted in a 6.1% and 4.8% increase in soybean yield, respectively (SS applied 20 gal/acre in-furrow and 40 or 20 gal/acre at R3, respectively). SS applied at 10 gal/acre in-furrow and 40 gal/acre at R3 (4) didn't show increase on the soybean yield with respect to control (1). These results demonstrated that two applications of SS, the first application in-furrow and the second application at R3 (post flowering), increased the soybean yield 4.4% on average with respect to untreated soybean plots. Furthermore, these results have demonstrated that a second application of SS before flowering (V4) achieved a better yield than a second application of SS after flowering (R3) in soybean crops.

To compliment the plant performance analysis, crude protein content was measured. An increased protein content after two applications of SS was observed in all cases with respect to untreated plants. Higher protein contents were found to be related to a higher SS application rate. In fact, the protein content showed a stronger correlation with respect to the application rate than the application timing. However, the highest protein values were found where SS was applied at 10 or 20 gal/acre in-furrow and 40 gal/acre at V4 or R3.

Conclusion

SS applied first in-furrow (10 gal/acre) and second at V4 (20 gal/acre) showed the best performance in terms of yield for soybean crop. These results have demonstrated that a second application of SS before flowering (V4) achieved a better yield than a second application of SS after flowering (R3) in soybean crops. Two applications of SS increased the protein content with respect to untreated plants, particularly after flowering.

Example 12: Effect of Black Soldier Fly Larvae Frass Tea on Cotton Plant Yield and Quality The Example set forth herein describes results from studies evaluating the effect of *Hermetia illucens* larvae frass tea (SS) application on cotton crop performance when applied at different crop developmental stages. Furthermore, different SS application rates were evaluated for its effect on cotton production and the effect of SS application was evaluated when applied at various levels of nitrogen fertilization.

Materials and Methods

Cotton plants are tested in 10×40 ft. plots with four replicates.

Treatment Protocols

The treatments were as follows: Untreated check (control), 2 app. *Hermetia illucens* larvae frass tea (SS) in-furrow (performed during planting, in the seed furrow allowing the seedling easy access to the product) and either at (a) pinhead (when the cotton bud is observed to have a pinhead square) (about 35-47 days after planting) or (b) at first bloom (which occurs about 21-28 days after the first pinhead square is observed. Synthetic Fertilizer (SF) meaning 32% UAN (urea/ammonium nitrate) post-emergence (POST) at 100% SF (29 gal/acre or alternatively referred to as gal/A POST) and 75% SF (21 gal/A POST) and 50% SF (14 gal/A POST). Specific treatment protocols are set forth in Table 17 infra.

TABLE 17

Treatment Protocol

| | Treatment | Rate (gal/A) | Application time |
|---|---|---|---|
| 1 | Check | | |
| 2 | SS | 10 | In-furrow (A) |
|   | SS | 20 | Pin head (B) |
|   | Fert 32% UAN | 29 | POST (D) |
| 3 | SS | 10 | In-furrow (A) |
|   | SS | 20 | First bloom (E) |
|   | Fert 32% UAN | 29 | POST (D) |
| 4 | SS | 10 | In-furrow (A) |
|   | SS | 40 | Pin head (B) |
|   | Fert 32% UAN | 29 | POST (D) |
| 5 | SS | 10 | In-furrow (A) |
|   | SS | 40 | First bloom (E) |
|   | Fert 32% UAN | 29 | POST (D) |
| 6 | SS | 20 | In-furrow (A) |
|   | SS | 20 | Pin head (B) |
|   | Fert 32% UAN | 29 | POST (D) |
| 7 | SS | 20 | In-furrow (A) |
|   | SS | 20 | First bloom (E) |
|   | Fert 32% UAN | 29 | POST (D) |
| 8 | SS | 20 | In-furrow (A) |
|   | SS | 40 | Pin head (B) |
|   | Fert 32% UAN | 29 | POST (D) |

TABLE 17-continued

Treatment Protocol

| Treatment | | Rate (gal/A) | Application time |
|---|---|---|---|
| 9 | SS | 20 | In-furrow (A) |
|  | SS | 40 | First bloom (E) |
|  | Fert 32% UAN | 29 | POST (D) |
| 10 | Fert 32% UAN | 29 | POST (D) |
| 11 | Fert 32% UAN | 14 | POST (D) |
| 12 | Fert 32% UAN | 21 | POST (D) |
| 13 | SS | 10 | In-furrow (A) |
|  | SS | 20 | Pin head (B) |
|  | Fert 32% UAN | 21 | POST (D) |
| 14 | SS | 10 | In-furrow (A) |
|  | SS | 20 | First bloom (E) |
|  | Fert 32% UAN | 21 | POST (D) |
| 15 | SS | 10 | In-furrow (A) |
|  | SS | 40 | Pin head (B) |
|  | Fert 32% UAN | 21 | POST (D) |
| 16 | SS | 10 | In-furrow (A) |
|  | SS | 40 | First bloom (E) |
|  | Fert 32% UAN | 21 | POST (D) |
| 17 | SS | 20 | In-furrow (A) |
|  | SS | 20 | Pin head (B) |
|  | Fert 32% UAN | 21 | POST (D) |
| 18 | SS | 20 | In-furrow (A) |
|  | SS | 20 | First bloom (E) |
|  | Fert 32% UAN | 21 | POST (D) |
| 19 | SS | 20 | In-furrow (A) |
|  | SS | 40 | Pin head (B) |
|  | Fert 32% UAN | 21 | POST (D) |
| 20 | SS | 20 | In-furrow (A) |
|  | SS | 40 | First bloom (E) |
|  | Fert 32% UAN | 21 | POST (D) |
| 21 | SS | 10 | In-furrow (A) |
|  | SS | 20 | Pin head (B) |
|  | Fert 32% UAN | 14 | POST (D) |
| 22 | SS | 10 | In-furrow (A) |
|  | SS | 20 | First bloom (E) |
|  | Fert 32% UAN | 14 | POST (D) |
| 23 | SS | 10 | In-furrow (A) |
|  | SS | 40 | Pin head (B) |
|  | Fert 32% UAN | 14 | POST (D) |
| 24 | SS | 10 | In-furrow (A) |
|  | SS | 40 | First bloom (E) |
|  | Fert 32% UAN | 14 | POST (D) |
| 25 | SS | 20 | In-furrow (A) |
|  | SS | 20 | Pin head (B) |
|  | Fert 32% UAN | 14 | POST (D) |
| 26 | SS | 20 | In-furrow (A) |
|  | SS | 20 | First bloom (E) |
|  | Fert 32% UAN | 14 | POST (D) |
| 27 | SS | 20 | In-furrow (A) |
|  | SS | 40 | Pin head (B) |
|  | Fert 32% UAN | 14 | POST (D) |
| 28 | SS | 20 | In-furrow (A) |
|  | SS | 40 | First bloom (E) |
|  | Fert 32% UAN | 14 | POST (D) |

Treatments 2 to 10 received 29 gal/A at planting and 29 gal/A at mid-season; Treatments 12 to 20 received 14 gal/A at planting and 29 gal/A mid-season; Treatment 11 and treatments 21 to 28 received 0 gal/A at planting and 29 gal/A mid-season.

Cotton Quality Tests

The cotton fiber quality tests were performed according to USDA standards (see 7 CFR 28 (PART 28—COTTON CLASSING, TESTING, AND STANDARDS, Subpart C-Standards) https://www.govinfo.gov/content/pkg/CFR-2018-title7-vol2/xml/CFR-2018-title7-vol2-part28.xml#seqnum28.105). In particular, the classification system for American Upland cotton consists of class identification of extraneous matter (if any) and instrument measurements for color grade, leaf grade, length, micronaire, strength, length uniformity index, color Rd, color +b, and trash percent area. All instrument measurements utilized in USDA cotton classification were from Uster High Volume Instrument (HVI)* systems.

Micronaire

Cotton's resistance to air flow per unit mass is measured to determine micronaire. Micronaire is a measure of the cotton's fineness and is reported to the nearest tenth. Micronaire and maturity are highly correlated within a cotton variety.

Strength

The fiber strength measurement is made by clamping and breaking a bundle of fibers with a ⅛-inch spacing between the clamp jaws. Results are reported in terms of grams per tex to the nearest tenth. A tex unit is equal to the weight in grams of 1,000 meters of fiber. Therefore, the strength reported is the force in grams required to break a bundle of fibers one tex unit in size. The following table shows some general descriptions of strength measurements in grams per tex.

TABLE 18

Fiber Strength

| Descriptive designation | Strength (grams per tex) |
|---|---|
| Weak | <23.4 |
| Intermediate | 23.5-25.4 |
| Average | 25.5-28.4 |
| Strong | 28.5-30.4 |
| Very strong | >30.5 |

Length

Classification instruments measure length in hundredths of an inch. Length is reported on the classification record in both 32nds and 100ths of an inch.

Length Uniformity Index

Length uniformity index is a three-digit number that is a measure of the degree of uniformity of the fibers in a sample to the nearest tenth. The descriptive terms listed below may be helpful in explaining the measurement results. Length uniformity is expressed in percentage.

TABLE 19

Length uniformity

| Descriptive designation | Length uniformity |
|---|---|
| Very low | <76.5 |
| Low | 76.5-79.4 |
| Average | 79.5-82.4 |
| High | 82.5-85.4 |
| Very high | >85.5 |

Results

SS applications were evaluated considering the crop yield and quality. The results set forth in Tables 20-22.

TABLE 20

Effect of SS on Cotton Yield and Quality-100% SF

| # | Trtmnt | Rate (gal/A) | Appln time | Yield (kg/ha) | Mike (fineness) | Len/Stpl (in) | Strength | Uniformity |
|---|---|---|---|---|---|---|---|---|
| 2 | SS | 10 | In-furrow | 793.5 b | 4.70 | 1.160 abc | 31.88 ab | 81.68 |
|   | SS | 20 | Pin head | | | | | |
|   | Fert 100% | | | | | | | |
| 3 | SS | 10 | In-furrow | 778.7 b | 4.85 | 1.168 abc | 32.20 ab | 82.53 |
|   | SS | 20 | First bloom | | | | | |
|   | Fert 100% | | | | | | | |
| 4 | SS | 10 | In-furrow | 1221.4 a | 4.85 | 1.198 ab | 33.45 a | 82.58 |
|   | SS | 40 | Pin head | | | | | |
|   | Fert 100% | | | | | | | |
| 5 | SS | 10 | In-furrow | 1211.6 a | 4.80 | 1.210 a | 33.30 ab | 82.75 |
|   | SS | 40 | First bloom | | | | | |
|   | Fert 100% | | | | | | | |
| 6 | SS | 20 | In-furrow | 919.1 ab | 4.85 | 1.188 ab | 31.68 ab | 81.75 |
|   | SS | 20 | Pin head | | | | | |
|   | Fert 100% | | | | | | | |
| 7 | SS | 20 | In-furrow | 870.0 ab | 4.99 | 1.133 c | 32.25 ab | 81.87 |
|   | SS | 20 | First bloom | | | | | |
|   | Fert 100% | | | | | | | |
| 8 | SS | 20 | In-furrow | 1021.8 ab | 4.73 | 1.185 ab | 31.93 ab | 81.95 |
|   | SS | 40 | Pin head | | | | | |
|   | Fert 100% | | | | | | | |
| 9 | SS | 20 | In-furrow | 932.2 ab | 4.88 | 1.163 abc | 32.13 ab | 82.60 |
|   | SS | 40 | First bloom | | | | | |
|   | Fert 100% | | | | | | | |
| 10 | Fert 100% | | | 824.7 b | 4.78 | 1.147 bc | 31.08 b | 81.69 |
|   | CV (%) | | | 23.72 | 4.15 | 2.58 | 4.18 | 1.5 |
|   | 0.05 | | | | | | | |
|   | Prob (F) | | | 0.0668 | 0.6523 | 0.0331 | 0.3258 | 0.8245 |

TABLE 21

Effect of SS on Cotton Yield and Quality-75% SF

| # | Trtmnt | Rate (gal/A) | Appln time | Yield (kg/ha) | Mike (fineness) | Len/Stpl (in) | Strength | Uniformity |
|---|---|---|---|---|---|---|---|---|
| 13 | SS | 10 | In-furrow | 1086.8 a | 4.83 ab | 1.165 | 32.13 | 82.50 |
|   | SS | 20 | Pin head | | | | | |
|   | Fert 75% | | | | | | | |
| 14 | SS | 10 | In-furrow | 853.2 ab | 4.83 ab | 1.160 | 31.85 | 82.03 |
|   | SS | 20 | First bloom | | | | | |
|   | Fert 75% | | | | | | | |
| 15 | SS | 10 | In-furrow | 972.8 ab | 4.93 a | 1.185 | 31.73 | 81.95 |
|   | SS | 40 | Pin head | | | | | |
|   | Fert 75% | | | | | | | |
| 16 | SS | 10 | In-furrow | 932.8 ab | 4.60 b | 1.180 | 31.85 | 81.95 |
|   | SS | 40 | First bloom | | | | | |
|   | Fert 75% | | | | | | | |
| 17 | SS | 20 | In-furrow | 1092.5 a | 5.00 a | 1.193 | 31.85 | 82.48 |
|   | SS | 20 | Pin head | | | | | |
|   | Fert 75% | | | | | | | |
| 18 | SS | 20 | In-furrow | 942.2 ab | 5.03 a | 1.170 | 32.13 | 82.08 |
|   | SS | 20 | First bloom | | | | | |
|   | Fert 75% | | | | | | | |
| 19 | SS | 20 | In-furrow | 879.6 ab | 4.79 ab | 1.185 | 32.90 | 82.37 |
|   | SS | 40 | Pin head | | | | | |
|   | Fert 75% | | | | | | | |
| 20 | SS | 20 | In-furrow | 753.2 b | 4.96 a | 1.189 | 31.96 | 82.77 |
|   | SS | 40 | First bloom | | | | | |
|   | Fert 75% | | | | | | | |
| 12 | Fert 75% | | | 1005.6 ab | 4.83 ab | 1.178 | 31.55 | 82.10 |
|   | CV (%) | | | 19.91 | 3.59 | 1.88 | 3.48 | 1.08 |
|   | Prob (F) | | | | | | | |
|   | 0.05 | | | 0.2691 | 0.0644 | 0.4627 | 0.8601 | 0.8881 |

TABLE 22

Effect of SS on Cotton Yield and Quality-50% SF

| # | Trtmnt | Rate (gal/A) | Appln time | Yield (kg/ha) | Mike (fineness) | Len/Stpl (inches) | Strength | Uniformity |
|---|--------|--------------|------------|---------------|-----------------|-------------------|----------|------------|
| 21 | SS<br>SS<br>Fert 50% | 10<br>20 | In-furrow<br>Pin head | 1025.9 | 4.74 b | 1.200 | 32.80 | 82.02 |
| 22 | SS<br>SS<br>Fert 50% | 10<br>20 | In-furrow<br>First bloom | 957.0 | 4.83 b | 1.168 | 32.13 | 81.83 |
| 23 | SS<br>SS<br>Fert 50% | 10<br>40 | In-furrow<br>Pin head | 839.4 | 5.03 ab | 1.158 | 31.73 | 82.05 |
| 24 | SS<br>SS<br>Fert 50% | 10<br>40 | In-furrow<br>First bloom | 975.2 | 5.05 ab | 1.187 | 32.40 | 83.08 |
| 25 | SS<br>SS<br>Fert 50% | 20<br>20 | In-furrow<br>Pin head | 1129.5 | 5.00 ab | 1.198 | 32.65 | 82.75 |
| 26 | SS<br>SS<br>Fert 50% | 20<br>20 | In-furrow<br>First bloom | 1070.8 | 5.19 a | 1.165 | 31.16 | 82.33 |
| 27 | SS<br>Fert 50%<br>SS<br>Fert 50% | 20<br>40 | In-furrow<br>Pin head | 997.2 | 4.88 ab | 1.175 | 32.23 | 82.25 |
| 28 | SS<br>SS<br>Fert 50% | 20<br>40 | In-furrow<br>First bloom | 861.3 | 5.03 ab | 1.188 | 32.45 | 82.83 |
| 11 | Fert 50% | | | 823.9 | 4.92 ab | 1.194 | 31.30 | 81.51 |
|  | CV (%) | | | 20.61 | 3.86 | 2.62 | 4.49 | 1.26 |
|  | Prob (F) 0.05 | | | 0.3800 | 0.0937 | 0.4683 | 0.7298 | 0.4906 |

Yield data trends demonstrated that SS applications increased cotton yield at certain rates when used with a 100% SS application (see Table 20). SS applications in-furrow applied at 10 gal/A followed by 40 ga/lA at pin head square or first bloom (Table 20) showed the best performance, enhancing yield by 48% and 47% respectively. SS applications in furrow applied at 20 gal/A followed by 20 or 40 gal/A showed a yield increase. A rate sequence of 20-20 gal/A enhanced yield by 5-11% and rate sequence 20-40 gal/A increased yield by 13-23%. Second applications performed at pin head square showed a better response and strong correlation with yield increases. SS applications also enhanced cotton fiber quality (Table 20). Cotton fiber length and strength from plots treated with SS were higher and statistically different than untreated plots (1-5% longer and 2-8% stronger), while micronaire and uniformity were slightly higher at some rates compared to the untreated plots (Table 5). Both pin head square and the other first bloom application times, had a positive response on cotton fiber (Table 20).

When SF was applied at 75% of the recommended use rate in combination with SS, yields were affected for the pin head square (PHS) application timing when it was applied at 10-20 gal/A or 20-20 gal/A showing an 8% yield increase (Table 21). Interestingly, these treatments showed improvements in cotton fiber quality. SS applications in furrow applied at 20 gal/A followed by 20 gal/A showed a higher impact in fiber quality, 3.5% higher micronaire, 1.2% longer, 1% stronger and higher uniformity (Table 21).

When SF was applied at 50% of the recommended use rate and combined with SS, a yield increase was observed. SS applied at 20 gal/A in-furrow followed by 20 gal/A at pin-head square, or first bloom showed 37 and 30% increase in yield, respectively. SS applied at 10 gal/A in-furrow followed by 20 gal/A at pin head square (PHS), or first bloom also showed a yield increase of 25 and 16%, respectively. When a second application was at PHS yield results were slightly better than a second application at first bloom. It appears that application sequences of 10 or 20 gal/A in furrow followed by 20 gal/A at pinhead square correlated with improved fiber length, strength, and uniformity (Table 22). Increasing rates to 40 gal/A did not seem to improve response further.

The results set forth above demonstrate that two applications of SS when used with a 100% SF increased cotton yields. SS application rates in-furrow followed by a second application at pin head square showed a better yield response. When 75% SF was applied, SS application increased yield when applied at pin head square at 20 gal/A. Increasing rates to 40 gal/A did not seem to improve response further while increasing cotton fiber quality. When 50% SF was applied, SS application increased yield. Interestingly, SS applications achieved a better yield at the pin head square stage at 20 gal/A and improved cotton fiber quality, which was a similar response when SS was combined with 75% fertilizer reduction. Increasing rates to 40 gal/A did not seem to improve response further.

Example 13: Effect of *H. illucens* Larvae Frass Tea on Soil Microbial Community In the Example described herein the results of studies on the effect of *H. illucens* Larvae Frass Tea ("SS" or alternatively "SS solution") on the soil microbial community composition are described.

Materials and Methods

Experimental Set Up

Trials were conducted in five different locations named as Site 1, Site 2, and Site 3. A check untreated (Control) site and treated with SS.

SS Solution 0.1 lb of SS was mixed with 2.5 gal of water and brewed for 48 hrs using a constant aeration always between 6-8 ppm $O_2$. After 48 hrs., activated SS was applied to each site. SS was applied twice, where the first application was in-furrow at 12-15 gal/A rate, followed by a second application before flowering at 15-20 gal/A.

Soil Sample Collection

Soil samples were collected after the application at the test sites. 10 core samples from various spots were randomly scattered across the test site at 0-6" depth. The cores were thoroughly mixed and kept cold until analysis. Samples were collected from both treated and untreated plots before the applications were performed, as a base line. Then, second samples were collected at the end of the season in both treated and untreated sites.

Phospholipid and Fatty Acid Analysis (PLFA)

Selected fatty acids pertaining to soil phospholipids (PLFA) were used as biomarkers for specific soil microbial communities. These substances were extracted using the modified Bligh and Dyer technique (Bligh E G, Dyer W J. A rapid method of total lipid extraction and purification. Can J Biochem Physiol. 1959; 37:911-7), as previously described (Bardgett R D, Hobbs P J, Frostegård Å. Changes in soil fungal:bacterial biomass ratios following reductions in the intensity of management of an upland grassland. Biol Fertil Soils. 1996; 22:261-4).

Results

Phospholipid and Fatty Acid Analysis (PLFA)

Two approaches for analyzing PLFA data were used. One relies on using the whole PLFA pattern, filtered through a multivariate statistical technique. The second approach involves trying to elucidate the effects on specific groups of microorganisms, assuming that certain PLFAs are markers for a particular group or at least indicative of changes in that group (Frostegård, Å., Tunlid, A. and Bååth, E. (2011) Use and misuse of PLFA measurements in soils. Soil Biol Biochem 43, 1621-1625).

Data was collected from three different geographical sites and were analyzed separately (Tables 23, 24, and 25), as representative of different type of soil and weather conditions. Each time, pre and post application samples were tested in both treated and untreated plots.

Site 1 represents black fertile soils. The PLFA test was performed in treated and untreated plot. % Change, describe the difference between the baseline (before the treatment) and post-harvest (after the treatment) in both the treated and untreated plots. SS vs. untreated plot difference is depicted as SS % Change Minus Untreated % change. The untreated site received the standard chemical treatment utilized by the farm. Increases after SS treatment showed a beneficial impact after harvest when most of the microbial community normally experiences losses (Table 23). There was an increase in microbial biomass (25.2%) and functionality (3.9%). This response was trigged by increases in total bacteria (17.2%) and total fungi (46.4%) populations.

TABLE 23

Site 1. Corn Studies

| PLFA test Corn | Untreated* | | | SS | | | SS% Change Minus Untreated |
|---|---|---|---|---|---|---|---|
| | Baseline | Post harvest | % Change | Baseline | Post harvest | % Change | % Change |
| Total Living Microbial Biomass, PLFA ng/g | 4664.16 | 3991.26 | −14.4% | 3692.84 | 4091.24 | 10.8% | 25.2% |
| Functional Group Diversity Index | 1.4 | 1.332 | −4.9% | 1.401 | 1.387 | −1.0% | 3.9% |
| Total Bacteria, PLFA ng/g | 2367.91 | 1211.92 | −48.8% | 1905.02 | 1303.36 | −31.6% | 17.2% |
| Gram Pos Others, PLFA ng/g | 915.09 | 625.93 | −31.6% | 791.62 | 633.5 | −20.0% | 11.6% |
| Actinomycetes, PLFA ng/g | 440.6 | 84.22 | −80.9% | 429.88 | 124.97 | −70.9% | 10.0% |
| Gram Neg Others, PLFA ng/g | 1012.23 | 501.77 | −50.4% | 683.53 | 544.9 | −20.3% | 30.1% |
| Total Fungi, PLFA ng/g | 400.56 | 281.96 | −29.6% | 284.95 | 332.72 | 16.8% | 46.4% |
| Arbuscular Mycorrhizal Fungi, PLFA ng/g | 142.58 | 103.55 | −27.4% | 100.53 | 121.54 | 20.9% | 48.3% |
| Saprophytic Fungi, PLFA ng/g | 257.98 | 178.41 | −30.8% | 184.42 | 211.18 | 14.5% | 45.4% |
| Fungi: Bacteria | 0.1692 | 0.2327 | 37.5% | 0.1496 | 0.2553 | 70.7% | 33.1% |
| Average | | | −28.1% | | | −1.0% | 27.1% |

*Untreated-Standard chemical treatment utilized by farm.

Site 2 represents Midwest soils. As with Site 1, the PLFA test was performed on treated and untreated plot. % Change, describes the difference between the baseline (before the treatment) and the post-harvest (after the treatment) in both the treated and untreated plot. StrongSoil vs. untreated plot difference is showed as SS % Change Minus Untreated % change. The untreated site received the standard chemical treatment utilized by the farm.

The results are set forth in Table 24. There was a high increase in microbial biomass (101.6%) and functionality (1.9%). This response was trigged by an increase in total bacteria (7.4%) and total fungi (84.3%) populations.

TABLE 24

Site 2. Soybean Studies

| PLFA test Soybeans | Untreated* Baseline | Untreated* Post harvest | Untreated* % Change | SS Baseline | SS Post harvest | SS % Change | SS % Change Minus Untreated % Change |
|---|---|---|---|---|---|---|---|
| Total Living Microbial Biomass, PLFA ng/g | 1953.47 | 3592.47 | 83.9% | 2127.97 | 6075.27 | 185.5% | 101.6% |
| Functional Group Diversity Index | 1.301 | 1.334 | 2.5% | 1.342 | 1.401 | 4.4% | 1.9% |
| Total Bacteria, PLFA ng/g | 806.09 | 1166.09 | 44.7% | 857.21 | 1303.38 | 52.0% | 7.4% |
| Gram Pos Others, PLFA ng/g | 471.31 | 648.77 | 37.7% | 450.32 | 678.82 | 50.7% | 13.1% |
| Gram Neg Others, PLFA ng/g | 250.89 | 281.48 | 12.2% | 231.1 | 374.82 | 62.2% | 50.0% |
| Total Fungi, PLFA ng/g | 143.58 | 183.4 | 27.7% | 116.09 | 246.17 | 112.1% | 84.3% |
| Arbuscular Mycorrhizal Fungi, PLFA ng/g | 58.39 | 49.6 | −15.1% | 49.76 | 120.37 | 141.9% | 157.0% |
| Saprophytic Fungi, PLFA ng/g | 85.19 | 133.81 | 57.1% | 66.32 | 125.8 | 89.7% | 32.6% |
| Undifferentiated, PLFA ng/g | 1003.8 | 2242.98 | 123.4% | 1154.67 | 4525.72 | 291.9% | 168.5% |
| Fungi:Bacteria | 0.1781 | 0.1573 | −11.7% | 0.1354 | 0.1889 | 39.5% | 51.2% |
| Average | | | 36.2% | | | 103.0% | 66.8% |

*Untreated-Standard chemical treatment utilized by farm.

Site 3 represents delta area soils. As with Sites 1 and 2, the PLFA test performed on samples from treated and untreated plot. % Change, describes the difference between the baseline (before the treatment) and the post-harvest (after the treatment) in both the treated and untreated plots. SS vs. untreated plot difference is shown as SS % Change Minus Untreated % change. The untreated site received the standard chemical treatment utilized by the farm.

The results are set forth in Table 25, infra. There was a high increase in microbial biomass (63.6%) and a strong response on functionality (23.8%), this response was triggered by an increase in both, total bacteria (61.2%) and total fungi (250.3%) populations.

TABLE 25

Site 3. Corn Studies

| PLFA test Corn | Baseline | Post harvest | % Change | Baseline | Post harvest | % Change | SS % Change Minus Untreated % Change |
|---|---|---|---|---|---|---|---|
| Total Living Microbial Biomass, PLFA ng/g | 2,356.96 | 1,437.76 | −39.0% | 1,473.99 | 1,837.03 | 24.6% | 63.6% |
| Functional Group Diversity Index | 1.26 | 0.94 | −24.9% | 1.10 | 1.09 | −1.1% | 23.8% |
| Total Bacteria, PLFA ng/g | 1,050.65 | 668.55 | −36.4% | 565.15 | 705.53 | 24.8% | 61.2% |
| Gram Pos Others, PLFA ng/g | 557.01 | 430.17 | −22.8% | 331.35 | 480.18 | 44.9% | 67.7% |
| Actinomycetes, PLFA ng/g | 315.23 | 178.06 | −43.5% | 105.78 | 49.18 | −53.5% | −10.0% |
| Gram Neg Others, PLFA ng/g | 178.41 | 60.33 | −66.2% | 128.02 | 176.17 | 37.6% | 103.8% |
| Total Fungi, PLFA ng/g | 95.38 | 15.77 | 83.5% | 26.81 | 71.53 | 166.8% | 250.3% |
| Arbuscular Mycorrhizal Fungi, PLFA ng/g | 31.46 | — | −100.0% | — | 33.82 | | |
| Saprophytic Fungi, PLFA ng/g | 63.93 | 15.77 | −75.3% | 26.81 | 37.72 | 40.7% | 116.0% |
| Undifferentiated, PLFA ng/g | 1,210.93 | 753.43 | −37.8% | 882.02 | 1,059.96 | 20.2% | 58.0% |

TABLE 25-continued

Site 3. Corn Studies

| PLFA test Corn | Baseline | Post harvest | % Change | Baseline | Post harvest | % Change | SS % Change Minus Untreated % Change |
|---|---|---|---|---|---|---|---|
| Fungi: Bacteria | 0.09 | 0.02 | −74.0% | 0.05 | 0.10 | 113.9% | 187.9% |
| Soil pH | 7.00 | 6.70 | −4.3% | 7.10 | 6.70 | −5.6% | −1.3% |
| Average | | | −50.6% | | | 37.6% | 83.7% |

*Untreated-Standard chemical treatment utilized by farm.

All headings and sub-headings are used herein for convenience only and should not be construed as limiting the invention in any way.

All publications and patents cited in this disclosure are incorporated by reference in their entirety. Nothing herein is to be construed as an admission that the invention is not entitled to antedate such disclosure by virtue of prior invention. To the extent the material incorporated by reference contradicts or is inconsistent with this specification, the specification will supersede any such material.

It must be noted that as used herein and in the appended claims, the singular forms "a," "and" and "the" include plural references unless the context clearly dictates otherwise.

Unless otherwise indicated, the term "at least" preceding a series of elements is to be understood to refer to every element in the series. Those skilled in the art will recognize or be able to ascertain using no more than routine experimentation, many equivalents to the specific embodiments of the invention described herein. Such equivalents are intended to be encompassed by the present invention.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about," where appropriate).

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter re-cited in the aspects or claims presented herein to the maximum extent permitted by applicable law.

The features disclosed in the foregoing description may, both separately and in any combination thereof, be material for realizing the invention in diverse forms thereof.

What is claimed is:

1. A formulation comprising black soldier fly (Hermetia illucens) larvae (BSFL) frass and at least one organic or inorganic substance, the formulation comprising by weight:
   (a) about 1.4% to about 3% nitrogen;
   (b) about 4% to about 6% phosphorus;
   (c) about 4% to about 6% potassium;
   (d) about 9% to about 16% calcium;
   (e) up to about 25% chitin, wherein the chitin is present; and
   (f) a plurality of microbes selected from the group consisting of spore formers, cellulose degraders, halophilic bacteria, phosphorus solubilizers, chitin utilizers, nitrifying bacteria, heterotrophic bacteria, and fluorescent Pseudomonads;
wherein the formulation does not contain detectable levels of pathogens as determined by a *Salmonella* test and fecal coliform test.

2. The formulation according to claim 1, wherein said formulation comprises by weight nitrogen in the amount of about 1.9% to about 2.4%, phosphorus in the amount of about 4.7% to about 5.3%, potassium in the amount of about 4.7% to about 5.3%, calcium in the amount of about 14% to about 15% and chitin in the amount of about 15% to about 25%.

3. The formulation according to claim 1, wherein said formulation is in a solid or liquid form.

4. The formulation according to claim 1, wherein said formulation is in a liquid form and frass in said formulation is present in the amount of at least 3 g/L aqueous solution.

5. The formulation according to claim 1, further comprising at least one other substance selected from the group consisting of an herbicide, fungicide, nematicide, bactericide, fertilizer, and/or soil amendment.

6. The formulation according to claim 5, wherein said other substance is an organic substance or synthetic substance.

7. The formulation according to claim 6, wherein said other substance is a synthetic substance and said synthetic substance is a synthetic herbicide selected from the group consisting of organophosphorus herbicides' phenoxyacetic herbicides and triazine herbicides.

8. The formulation according to claim 5, wherein said other substance is a fungicide which is selected from the group consisting of (a) a single site anti-fungal agent, wherein said single site anti-fungal agent is selected from the group consisting of benzimidazole, morpholine, hydroxypyrimidine, anilinopyrimidine, phosphorothiolate, quinone outside inhibitor, quinoline, dicarboximide, carboximide, phenylamide, phenylpyrrole, aromatic hydrocarbon, cinnamic acid, hydroxyanilide, antibiotic, polyoxin, acylamine, phthalimide, benzenoid, and xylylalanine, (b) a demethylation inhibitor selected from the group consisting of imidazole, piperazine, pyrimidine, and triazole, and (c) a multi-site non-inorganic, chemical fungicide selected from the group consisting of a nitrile, copper, quinoxaline, sulphamide, phosphonate, phosphite, dithiocarbamate, phenylpyridinamine, cyano-acetamide oxime, fludioxonil and mefenoxam.

9. The formulation according to claim 6, wherein said other substance is an organic substance, and said organic substance is an organic fertilizer which is selected from the group consisting of fulvic and humic acids, botanicals, blood meal, feather meal, fish emulsion, guano, seaweed and seaweed extracts and products derived therefrom, and manure.

10. The formulation according to claim 6, wherein said other substance is a synthetic substance and said synthetic substance is a synthetic fertilizer which is an NPK fertilizer or UAN fertilizer.

11. The formulation according to claim 5, wherein said other substance is a soil amendment, wherein said soil amendment is humic and fulvic acid, compost, bone meal, bone char, biochar, biosolids, dried molasses, kelp, rice hulls, organic feather meal, soy hydrolysate or rock phosphate compost.

12. The formulation according to claim 5, wherein said other substance is a nematicide which is selected from the group consisting of fenamiphos, fluensulfone, aldicarb, oxamyl, carbofuran, avermectin, fluopyram, metam sodium, picloram, 1,3-D, *Quillaja* extract, chitosan and other shellfish waste/extracts, fungi *Pochonia* spp., *Paecilomyces Quillaja*, and *Muscodor* spp., bacteria *Bacillus* spp., *Pasteuria penetrans, Burkholderia rinojensis, lilacinus* and *Chromobacterium subtsugae*.

13. The formulation according to claim 1, wherein said formulation is in solid form and further comprises dried larvae.

14. The formulation according to claim 1, wherein said formulation is in liquid form and said plurality of microbes are present in an amount of at least $1 \times 10^7$ CFU/ml.

15. A method for stimulating and/or improving and/or promoting plant performance, comprising applying the formulation of claim 1 to a plant growth medium, a plant and/or a plant seed in an amount effective to stimulate and/or improve and/or promote said plant performance.

16. The method according to claim 15, wherein said plant is an agricultural crop.

17. The method according to claim 15, wherein said method further comprises applying said formulation in combination with at least one other substance, wherein said other substance is an herbicide, fungicide, nematicide, bactericide, fertilizer, and/or soil amendment.

18. The method according to claim 15, wherein said plant is an agricultural crop selected from the group consisting of wheat, alfalfa, sunflower, peanuts, strawberries, Bermuda grass, rye grass, fescue, tomato, corn, sorghum, cotton, hemp, lemon, soybean, orange and grapefruit.

19. A method for promoting and/or improving soil health comprising applying the formulation of claim 1 or said formulation in combination with at least one of a fertilizer and/or soil amendment to the soil in an amount effective to promote and/or improve soil health.

20. A method for modulating the emergence and/or growth of monocotyledonous, sedge or dicotyledonous weeds, phytopathogenic fungi and bacteria, and/or modulating nematode infestation in a plant comprising applying the formulation of claim 1 to said plant and/or seeds thereof and/or growth medium used for growing said plant and/or weeds in an amount effective to modulate said nematode infestation and/or emergence or growth of monocotyledonous, sedge or dicotyledonous weeds phytopathogenic or fungal or bacterial growth.

21. The method according to claim 20, wherein said method further comprises applying said formulation in combination with at least one other substance, wherein said other substance is an herbicide, fungicide, nematicide, bactericide, fertilizer, and/or soil amendment.

22. The method according to claim 20, wherein said phytopathogenic fungi is selected from the group consisting of *Botrytis, Colletotrichum, Rhizoctonia, Epicoccum, Phytophthora, Pythium, Verticillium* and *Fusarium*.

23. A method of reducing fertilizer, herbicide, fungicide, nematicide or soil amendment use without reduction to plant yield compared to standard fertilizer, herbicide, fungicide, bactericide, soil amendment, or nematicide use and/or improving the effectiveness of fertilizer, herbicide, bactericide, fungicide, nematicide or soil amendment comprising applying the formulation of claim 1 in combination with said fertilizer, bactericide, herbicide, fungicide, nematicide or soil amendment to plant growth medium, a plant, and/or a plant seed and/or weeds in an amount effective to reduce said fertilizer, herbicide, fungicide, nematicide or soil amendment use without reduction to plant yield compared to standard fertilizer, herbicide, fungicide, bactericide, soil amendment, or nematicide use and/or improve the effectiveness of fertilizer, herbicide, bactericide, fungicide, nematicide or soil amendment.

24. The method according to claim 23, wherein said plant growth medium is soil.

25. The method according to claim 23, wherein said formulation s applied prior to and/or concurrently with and/or after application of said fertilizer, herbicide, bactericide, fungicide, nematicide or soil amendment.

26. The method according to claim 23, wherein said formulation is applied in liquid form.

27. The method according to claim 26, wherein said formulation is applied to plant growth medium, said plant and/or said seed in the form of an aqueous solution in the amount of about 1-40 gallons of formulation/acre.

* * * * *